United States Patent
Sieradzki et al.

(10) Patent No.: US 11,110,696 B2
(45) Date of Patent: Sep. 7, 2021

(54) SYSTEM AND METHOD FOR ON-DEMAND COLORIZATION FOR EXTRUSION-BASED ADDITIVE CONSTRUCTION

(71) Applicant: R3 Printing, Inc., Wilmington, DE (US)

(72) Inventors: Paul Sieradzki, New York, NY (US); Daniel Downs, Denville, NJ (US)

(73) Assignee: R3 Printing, Inc., Wilmington, DE (US)

( * ) Notice: Subject to any disclaimer, the term of this patent is extended or adjusted under 35 U.S.C. 154(b) by 0 days.

(21) Appl. No.: 16/585,243

(22) Filed: Sep. 27, 2019

(65) Prior Publication Data

US 2020/0031110 A1 Jan. 30, 2020

Related U.S. Application Data

(63) Continuation of application No. 15/349,144, filed on Nov. 11, 2016, now Pat. No. 10,471,697.

(Continued)

(51) Int. Cl.
*B29C 48/255* (2019.01)
*B33Y 30/00* (2015.01)
(Continued)

(52) U.S. Cl.
CPC .............. *B33Y 30/00* (2014.12); *B29C 48/05* (2019.02); *B29C 48/2552* (2019.02);
(Continued)

(58) Field of Classification Search
CPC ..... B29C 48/2552; B29C 48/05; B29C 48/92; B29C 48/02; B29C 48/304; B29C 48/277;
(Continued)

(56) References Cited

U.S. PATENT DOCUMENTS

| | | |
|---|---|---|
| 4,488,879 A | 12/1984 | Fikentscher et al. |
| 4,556,011 A | 12/1985 | Tarr |

(Continued)

FOREIGN PATENT DOCUMENTS

| | | |
|---|---|---|
| CA | 2111449 A1 | 6/1994 |
| CN | 1530489 A | 9/2004 |

(Continued)

OTHER PUBLICATIONS

Todd Halterman, "Wisconsin Students Bring On-Demand Color Capability to Most FDM 3D Printing 13D Printer World", http://www.3dprinterworld.com/article/wisconsin-students-bring-demand-color-capability-most-fdm-3d-printing, (Published, Mar. 14, 2014).

*Primary Examiner* — Joseph S Del Sole
*Assistant Examiner* — Lawrence D. Hohenbrink, Jr.
(74) *Attorney, Agent, or Firm* — MG Miller Intellectual Property Law LLC

(57) ABSTRACT

A color 3D printer and its method of use are disclosed. The color 3D printer uses a number of chambers to dye a filament to a given color. This colored filament is then extruded, pursuant to an associated 3D model of an object, to produce varying colored physical objects, on demand, with the use of a single filament and a single print head. Further, the color 3D printer features a waste management apparatus which provides a number of ways to dispose of waste fluid.

19 Claims, 16 Drawing Sheets

Related U.S. Application Data

(60) Provisional application No. 62/254,913, filed on Nov. 13, 2015.

(51) Int. Cl.

| | | |
|---|---|---|
| *B33Y 10/00* | (2015.01) | |
| *B33Y 50/02* | (2015.01) | |
| *B29C 64/118* | (2017.01) | |
| *B33Y 70/00* | (2020.01) | |
| *B29C 48/05* | (2019.01) | |
| *B29C 48/275* | (2019.01) | |
| *B33Y 40/00* | (2020.01) | |
| *B29C 64/307* | (2017.01) | |
| *B29C 64/314* | (2017.01) | |
| *B29C 64/255* | (2017.01) | |
| *B29C 64/343* | (2017.01) | |
| *B29B 7/24* | (2006.01) | |
| *B29B 7/60* | (2006.01) | |
| *B29C 48/92* | (2019.01) | |
| *B29C 48/02* | (2019.01) | |
| *B29C 48/17* | (2019.01) | |
| *B29C 48/25* | (2019.01) | |
| *B29C 48/30* | (2019.01) | |

(52) U.S. Cl.
CPC ............ *B29C 64/118* (2017.08); *B33Y 10/00* (2014.12); *B33Y 50/02* (2014.12); *B33Y 70/00* (2014.12); *B29B 7/244* (2013.01); *B29B 7/603* (2013.01); *B29C 48/02* (2019.02); *B29C 48/17* (2019.02); *B29C 48/266* (2019.02); *B29C 48/277* (2019.02); *B29C 48/304* (2019.02); *B29C 48/92* (2019.02); *B29C 64/255* (2017.08); *B29C 64/307* (2017.08); *B29C 64/314* (2017.08); *B29C 64/343* (2017.08); *B29C 2948/9258* (2019.02); *B29C 2948/92571* (2019.02); *B29K 2995/002* (2013.01); *B29K 2995/0021* (2013.01); *B33Y 40/00* (2014.12); *Y02P 70/10* (2015.11)

(58) Field of Classification Search
CPC .................. B29C 48/266; B29C 48/17; B29C 2948/9258; B29C 2948/92571; B29C 64/307; B29C 64/314; B29C 64/343; B29C 64/255; B29C 64/118; B29B 7/244; B29B 7/603; B29K 2995/002; B29K 2995/0021; B33Y 10/00; B33Y 30/00; B33Y 50/02; B33Y 70/00; Y02P 70/00
USPC ..................... 264/78, 308; 425/375
See application file for complete search history.

(56) References Cited

U.S. PATENT DOCUMENTS

| | | |
|---|---|---|
| 4,684,488 A | 8/1987 | Rudolph |
| 5,364,417 A | 11/1994 | Wenstrup et al. |
| 5,723,517 A | 3/1998 | Campo et al. |
| 6,010,032 A * | 1/2000 | Vermylen ........... B01F 15/0412 222/1 |
| 6,130,752 A | 10/2000 | Smith |
| 6,165,406 A | 12/2000 | Jang et al. |
| 6,183,079 B1 | 2/2001 | Meade et al. |
| 6,285,453 B1 | 9/2001 | Smith |
| 6,902,246 B2 | 6/2005 | Varnon et al. |
| 6,960,259 B2 | 11/2005 | Takekoshi et al. |
| 7,645,403 B2 | 1/2010 | Nielsen et al. |
| 8,142,860 B2 | 3/2012 | VanMaele et al. |
| 8,709,322 B2 | 4/2014 | Boor |
| 2004/0028825 A1 | 2/2004 | Manes |
| 2007/0256255 A1* | 11/2007 | Witman ................. C03C 17/38 8/506 |
| 2007/0256631 A1 | 11/2007 | Lintner et al. |
| 2009/0268217 A1* | 10/2009 | Silverbrook ......... G06F 1/1601 358/1.8 |
| 2013/0209600 A1* | 8/2013 | Tow ...................... B33Y 30/00 425/375 |
| 2013/0328228 A1 | 12/2013 | Pettis et al. |
| 2014/0079841 A1 | 3/2014 | Pridoehl et al. |
| 2014/0134334 A1 | 5/2014 | Pridoehl et al. |
| 2014/0134335 A1 | 5/2014 | Pridoehl et al. |
| 2014/0199495 A1 | 7/2014 | Pervan et al. |
| 2014/0277661 A1 | 9/2014 | Amadio et al. |
| 2015/0375451 A1* | 12/2015 | Voris ..................... B33Y 10/00 264/78 |
| 2016/0052208 A1* | 2/2016 | Debora ................ B29C 64/118 264/40.1 |
| 2016/0370792 A1* | 12/2016 | Jacobs .................... B29C 64/35 |
| 2017/0057159 A1* | 3/2017 | Lam ....................... C08L 77/02 |

FOREIGN PATENT DOCUMENTS

| | | |
|---|---|---|
| CN | 101446034 A | 6/2009 |
| CN | 101871163 A | 10/2010 |
| CN | 103878982 A | 6/2014 |
| EP | 0603605 A1 | 6/1994 |
| WO | 2001034371 A2 | 5/2001 |
| WO | 2003016067 A2 | 2/2003 |
| WO | 2004096514 A2 | 11/2004 |
| WO | 2007131081 A2 | 11/2007 |
| WO | 2012152511 A1 | 11/2012 |
| WO | 2014039825 A2 | 3/2014 |
| WO | 2014072148 A1 | 5/2014 |

* cited by examiner

SYSTEM AND METHOD FOR ON-DEMAND COLORIZATION FOR EXTRUSION-BASED ADDITIVE CONSTRUCTION

CLAIM OF PRIORITY

This application is a continuation of U.S. Non-provisional patent application Ser. No. 15/349,144 entitled "System and Method for On-demand Colorization for Extrusion-based Additive Construction" filed on Nov. 11, 2016, and claims priority from U.S. Provisional Patent Application No.: 62/254,913 entitled "System and Method for On-demand Colorization for Extrusion-based Additive Construction" filed on Nov. 13, 2015.

FIELD OF THE EMBODIMENTS

The field of the present invention and its embodiments relate to a system and method for allowing the on-demand colorization of objects created by extrusion-based additive construction. In particular, the system and method provide for the coloration of a given filament to be used in this construction via a unique mixture of dyes.

BACKGROUND OF THE EMBODIMENTS

There have been many advancements in recent years in relation to extrusion-based additive construction, (hereinafter "EAC"), also commonly known as "fused deposition modeling" and "fused filament fabrication." Regardless of which name is used, one unsolved challenge exists in relation to this technology; namely, a streamlined method for integrating a plurality of widely varying colors for EAC on an on-demand basis. Today, when using an extrusion-based additive construction printer for EAC, a thermoplastic filament is melted and subsequently extruded at specific points in a given horizontal (X, Y) plane.

This process is achieved when the filament used for construction travels through the print head of an EAC printer. Typically, this print head is comprised of two critical components: an "extruder" and a "hot end," respectively. The extruder controls the rate at which the filament is fed into the hot end. The hot end reforms the filament by supplying heat sufficient to cause partial melting of the filament so that the semi-solid filament can be deposited at precise points on the horizontal (X, Y) plane through a nozzle, where each plane is constructed consecutively one at a time, and where each horizontal plane is stacked one on top of another in the vertical direction (Z). At the hot end, a controlled change of state of the material input occurs, where the filament is changed from a solid form to semi-solid form, allowing for its deposition. This process of planar construction is repeated at an integrally different vertical plane (Z), so that the previous plane serves as a support for the subsequent plane, until the desired object has been constructed.

Most EAC printers use thermoplastic construction material, such as a filament, which has been wound onto a spool. The manufacturers of these filaments are responsible for any color, or lack thereof, of the filament spool. Typically, this color is added to the filament by the use of mixing concentrated solid pigments called "masterbatches" with the other raw materials of the filament, resulting in a colored filament, which is then spooled.

In current methods of EAC 3D printing, the printed object bears the same color qualities as the filament feed used to create it. That is, in order to construct an object with a different color, the user must manually manipulate the extruder to accept a different, desired filament. This method carries with it three distinct disadvantages; it requires the user to stock filament spools of all the desired colors the user may wish to use in the EAC print; it limits the user to the colors of filaments that the manufacturers produce and supply; and this method requires the user to manually switch the machine's material feed for each change of color. As such, these methods of the prior art are limited by the availability of color filament choice which are offered by the manufacturers, which require the user's time and effort and technical skill while precluding the user's ability to print in different colors on-demand, remotely.

Some solutions in the prior art exist to overcome the aforementioned limitations of on-demand colorization in EAC. These solutions generally adhere to one of the following three guiding technical arrangements. The first involves a method which makes use of having a plurality of print heads, each having a filament with a unique color. The second solution involves making use of a single print head capable of accepting a plurality of filaments, each filament having a unique color. Finally, the third guiding concept involves a method which makes use of having a single print head and a single filament where the filament is colored 'upstream' by the use of a series of color applicators, each applicator having a unique color, before reaching the print head.

In this first example, where colorized EAC is achieved through use of multiple printheads each with its own uniquely colored filament, the primary objective can be achieved. However, while this method solves many of the primary objectives such as colorization of a 3D model, the solution presents many other issues such as having to manually change the color of the filaments for each printhead when a new filament color is desired outside of what is already loaded into the head. Moreover, this method introduces new problems to EAC such as the back and forth motion in the horizontal direction of the printhead being required to be much slower due to the higher inertial forces involved in accurately positioning the multiple printheads, which are significantly heavier than the single-printhead variant. It should be noted that this multiple-printhead design can greatly increase the printing times, further reducing the efficiency of printing. This is due, in part, to the fact that only one printhead may be engaged at a time, and the active printhead must be brought into place before it may dispense the filament. In addition to the increased mass of having several print heads, there is now an issue of size; due to the fact that each printhead needs to be able to reach to every point in the horizontal plane of the object to be printed, the horizontal print area can reasonably be expected to be reduced, when compared to a printer having the same arrangement with only one printhead. This challenge can be overcome only by increasing the size of the EAC printer, however, this increased size introduces a multitude of problems, not the least of which is that the printer becomes too large to store in many places. This arrangement is both cumbersome to maintain and much too slow to be practical.

In general, the second method of having multiple filaments, each with a unique color, fed into one printhead overcomes many of the aforementioned problems. One example of this method is described in U.S. Pat. No. 8,827,685. In this method, colorization of EAC is achieved by individually controlling the rate at which each colored filament is pushed through the hot end. While at first blush this appears to be an elegant solution, the reality is that having several filaments feed into the hot end actually decreases the likelihood that each filament will each be properly heated so that it may be deposited on the build object. An imperfectly melted filament might not pass through the nozzle to become the build object, causing a jam. Further, the difficulty in heating can also affect whether each filament can mix proportionally and precisely after being heated to achieve the desired composite color before extrusion. Where there are several filaments which can be combined to give a desired color, imperfectly melted filaments can lead to a 'swirly' effect where each filament color is clearly identifiable as opposed to the desired composite color.

In the third method for the colorization of EAC, all of the aforementioned challenges can potentially be addressed. In this arrangement, a single virgin or uncolored filament, upstream of the printhead, obtains new properties including color characteristics via a molecular coating specifically applied on the outer surface of the filament, as described in U.S. Patent Publication Number 2014/0134335. While this third option is the most attractive solution of the three approaches, in practice, this method is hampered by the fact that color is applied only to the surface of the filament. Spraying the surface of the filament with color leads to a reduction of the intensity of color of the extruded thermoplastic filament, and consequently the object being constructed. Additionally, this method also increases the probability that the colored surfaces of the filament will swirl around the uncolored (or lesser colored) innermost segments of the filament due to the nature of how the filament is heated and extruded; namely, specifically, this may happen due to the significant reduction in diameter of the filament between before extrusion, and after extrusion when the diameter is relatively smaller.

If only the surface area of the filament is colored, then the innermost segments of the filament will stay the original color of the filament. Perfect extruded color can only be achieved if the outside of the extruded thermoplastic is the outside of the filament input or if the filament before extrusion is a homogeneous color throughout its diameter. Because of the reduction in diameter of the filament after extrusion, the outside of the extruded plastic is not always the outside of the filament input, therefore allowing for some of the undyed interior color to show. This results in the overall effect of dulling the color of the constructed object or in the case of imperfect mixing before extrusion, having the overall effect of being 'swirly'. The present invention and its embodiments meets and exceeds these objectives.

Review of Related Technology

U.S. Pat. No. 4,556,011 pertains to a multi-fluid dispensing system especially suited for web tinting machines or the like. A plurality of fluid and, optionally, air-tight tanks are provided. In a recirculating embodiment, the tanks feed fluid to, and receive fluid from, two manifolds. The upper (output) manifold receiving fluid from each tank slopes to gravity drain into the second manifold. The second (inlet) manifold is level to eliminate low spots for fluid accumulation. The inlet manifold drains into the tanks through valves in the side of, and level with, the manifold. A non-recirculating embodiment uses only the second manifold with pressurized tanks. An optional flush tank may be provided.

U.S. Pat. No. 6,130,752 pertains to an on-line color monitoring and control system and method includes feeding of colorant in a given amount or ratio in order to achieve a desired color of a product. The system and method described here achieve reliable on-line color control of synthetic fibers, single moving yarn (or fiber) or a collection of moving fibers. The color characteristic of the product is sensed and processed to generate a control signal for adjusting the amount of colorant being fed. Color measurement takes place either prior to or after spooling of the product.

U.S. Pat. No. 6,165,406 pertains to a freeform fabrication process and apparatus for making a colorful 3-D object. The process includes operating a multiple-channel droplet deposition device for supplying and, on demand, ejecting droplets of multiple liquid compositions containing a solidifiable baseline body-building material and different colorants; providing a support platform a distance from this deposition device to receive the droplets therefrom; and during the droplet ejecting process, moving the deposition device and the platform relative to one another in an X-Y plane and in a Z direction orthogonal to the X-Y plane so that the droplets are deposited to form multiple layers to build a colorful 3-D object. These steps are executed under the control of a computer system by taking additional steps of creating a geometry and color pattern of the object on a computer with the geometry including a plurality of color-coded segments defining the object; generating programmed signals corresponding to each of the segments in a predetermined sequence; and moving the deposition device and the platform relative to each other in response to these programmed signals. Preferably, the system is also operated to generate a support structure for any un-supported feature of the object.

U.S. Pat. No. 6,183,079 pertains to an ink jet printer is provided comprising a housing, an ink jet printing apparatus and a coating apparatus. The ink jet printing apparatus is located within the housing and includes an ink jet printing device capable of ejecting ink droplets onto a first side of a printing substrate which moves through the housing along a printing substrate feed path. The coating apparatus is positioned along the printing substrate feed path and spaced from the printing device. The coating apparatus applies a substantially uniform layer of coating material onto at least a portion of the first side of the printing substrate.

U.S. Pat. No. 6,285,452 pertains to a portable spectrophotometer providing improved movement and control of the sample during analysis. The unit includes a base and an upper assembly supported on the base for floating movement. Both a spectral measurement engine and drive rollers are contained within the upper assembly. The base includes independently suspended idler rollers, and the drive rollers engage the idler wheels, so that at least a portion of the weight of the upper assembly is borne by the engaging drive rollers and idler rollers. The upper assembly therefore floats up and down with samples of varying thickness moving between the rollers. Additional upstream idler rollers on the base and the upper assembly engage one another and bear a portion of the weight of the upper assembly to create tension in opposition to the drive rollers to hold the sample taut. A planar media guide is located on the underside of the upper assembly and surrounds the spectral engine to engage the sample and reduce flexing and bowing of the sample. A manually actuated backer is supported by the base to selectively present to the spectral engine one of two areas with different reflective properties. The unit may include a first light source in the spectral engine and a second light source in the backer so that the spectrophotometer is capable of both reflective and transmissive analysis.

U.S. Pat. No. 8,827,685 pertains to a nano-imprint mold includes a mold base; mold body having a first surface and a second surface opposite the first surface; and an elastic body disposed between a surface of the mold base and the first surface of the mold body, the elastic body being composed of resin. The second surface of the mold body is provided with a nano-imprint pattern. In addition, the elastic body has a bulk modulus lower than a bulk modulus of the mold body.

U.S. Patent Publication No.: 2007/0256631 pertains to a coating distribution system with inline injection capability that permits a base coating material to be divided into a plurality of portions, separate treatment of each portion to form a plurality of final coating compositions and recovery of the untreated base coating material. The system permits the simultaneous formation of a plurality of different final coating compositions from a single base coating material while permitting the bulk of the base coating material to remain unchanged. Using the system enables better control over the consistency of the base coating material and reduces clean up time between changes in the final coating compositions.

U.S. Patent Publication No.: 2014/0079841 pertains to a modified fused deposition modeling process for production of multicolored three-dimensional objects. More particularly, the invention relates to a 3D printing process with which 3D objects with particularly good color appearance compared to the prior art can be produced. The process according to the invention is based on coloring of the polymer strand used for production of the actual object in the nozzle, and on using a mixing apparatus which comprises a plurality of injection needles, a static mixer or a dynamic mixer.

U.S. Patent Publication No.: 2014/0134334 pertains to a 3D extrusion print process for producing multicolored three-dimensional objects is provided. The process produces mechanically stable, multicolored 3D objects with good color definition. The process according to the invention is based on coating, upstream of the printing head, of the polymer strand used for producing the actual object, and on fixing of the coating upstream of entry of the polymer strand into the printing head. Downstream of the extrusion process in the printing head, the coating remains predominantly at the surface of the extruded strand.

U.S. Patent Publication No.: 2014/0134335 pertains to a novel process for the production of coated filaments for subsequent application as print in extrusion-based 3D printers, e.g. FDM printers (fused deposition modelling printers). The filaments are coated in a separate process outside of the printer, and can also be used in a conventional extrusion printer. The present invention further relates to the coating device for application of the coating to the filament and to a roll containing the coated filaments.

International Patent Application No.: WO 2012/152511 pertains to a modified fused deposition modeling process for production of multicolored three-dimensional objects. More particularly, the invention relates to a 3D printing process with which 3D objects with particularly good color appearance compared to the prior art can be produced. The process according to the invention is based on coloring of the polymer strand used for production of the actual object in the nozzle, and on using a mixing apparatus which comprises a plurality of injection needles, a static mixer or a dynamic mixer.

Various systems and methodologies are known in the art. However, their structure and means of operation are substantially different from the present disclosure. The other inventions fail to solve all the problems taught by the present disclosure. The present invention and its embodiments take an approach for the colorization of EAC 3D printing, in a manner that provides for increased automation, reduced size, and higher productivity. At least one embodiment of this invention is presented in the drawings below and will be described in more detail herein.

SUMMARY OF THE EMBODIMENTS

The present disclosure provides for an extrusion-based 3D printer, for constructing objects out of a completely colored filament, the 3D printer comprising: a tank system having a plurality of puncture mechanisms, a corresponding number of subchambers and a corresponding number of pumps, each pump being in fluid communication with one subchamber, wherein each subchamber has an interior chamber equipped with a single opening, the opening being sealed by a penetrable membrane; a mixing chamber having an interior volume, a filament input, a filament output, and a waste outlet, wherein the mixing chamber is in fluid communication with the plurality of pumps, wherein the plurality of pumps are configured to independently pump fluid from the corresponding subchamber, a material dispenser configured to dispense uncolored filament to the filament input; a waste management system in fluid communication with the waste outlet; a print head having an extruder configured to receive filament through the filament output. In some embodiments, the plurality of subchambers are disposable, while in others the plurality of subchambers are refillable. Preferably, at least one of the subchambers contain a dye within the interior chamber and each dye to one color in a color chart. In some embodiments this color chart is the CMYK chart, in others it is the PMS spectrum, and in others it is the RGB color chart. A number of dyes are suitable for use with the present invention, including disperse dyes and water-soluble dyes. The type of dye used depends on the type of material the filament is constructed out of. If the dye is a disperse dye then the filament may be constructed out of polyamide, acrylonitrile butadiene styrene, polylactic acid, or polycarbonate. In some embodiments, the dye may require additional heat to fully color the filament and in those embodiments, the mixing chamber further comprises a heating element capable of heating the mixing chamber. In embodiments that use water-soluble dye, preferably one of the subchambers is filled with water or an additional water line is included in the printer. This provides the ability to easily clean the mixing chamber upon completion of the print object, as well as provides the ability to dilute the dyes to lighter colors, providing a greater range of possible colors. In embodiments where water-soluble dye is used, the filament is preferably constructed out of polyamide or polystyrene. In other embodiments, the waste management system includes a drain in fluid connection with a collection vessel and in others it also includes a heater capable of heating the collection vessel. Alternatively, the waste management system can include at least one ultrasonic generator located within the collection vessel.

The present disclosure also discloses a method of constructing objects out of a completely colored filament, by an extrusion-based 3D printer having a tank system having a plurality of puncture mechanisms, a corresponding number of subchambers and a corresponding number of pumps, each pump being in fluid communication with one subchamber, wherein each subchamber has an interior chamber equipped with a single opening, the opening being sealed by a penetrable membrane, a mixing chamber having an interior volume, a filament input, a filament output, and a waste outlet, wherein the mixing chamber is in fluid communication with the plurality of pumps, wherein the plurality of pumps are configured to independently pump fluid from the corresponding subchamber, a material dispenser configured to dispense uncolored filament to the filament input, a waste management system in fluid communication with the waste outlet, a print head having an extruder configured to receive filament through the filament output, the method comprising the steps of: accessing, by a user, a software application; selecting, by the user within the software application, a file representing an object to be printed by the 3D printer; obtaining, by the software application, at least one color related to the object; referencing, the at least one color with a color chart; determining, a predetermined amount of the plurality of dyes needed to create the color from the previous step; sending, by the software application, instructions of how to create the object to the 3d printer; feeding, by the material dispenser, a portion of filament into the mixing chamber; pumping, by the plurality of pumps, an amount of each of the plurality of dyes needed to create the desired color into the mixing chamber; allowing, the portion of filament to be completely dyed by the dyes contained in the mixing chamber, for a predetermined amount of time; extruding, by the print head, the colored filament to create the object; repeating the previous three steps until the object is completed with the desired color profile. The method can also include the step of draining, the dye in the mixing chamber to the waste management system and/or the step of heating the dye chamber prior to the step of allowing the amount of filament to be completely dyed by the dyes contained in the mixing chamber, for a predetermined amount of time. Finally, yet another embodiment exists that when the subchambers are empty they are replaced with a pre-filled subchamber containing a dye.

This invention enables EAC to create objects in various colors, on-demand, without the need for user intervention, and without various combinations of multiple extruders and/or multiple feeds of filaments. This method produces colored physical models with a single extruder-hot-end pair (print head) and a single filament feed by importing the process of filament colorization, by submerging the filament in a unique mixture of liquid dyes, to within the EAC 3D printer. In some embodiments, this colorization method uses water-soluble liquid dyes, which will penetrate through and attach to the filament, in so doing, imbuing the filament with a desired color. In other embodiments, acid dyes, disperse dyes, or substantive dyes, depending on the material used for the filament. Different colors are achieved by uniquely combining various dyes in a specialized mixing chamber. The proportion and volume of each dye added is controlled by a unidirectional peristaltic pump, whose motion has been determined by the output of a slicing program, whose partial function it is to convert the user's uploaded file into the volume of each liquid dye needed, which further determines when and for how long the pump will need to be in motion for that particular object to be constructed. The mixing chamber will host different combinations of dyes depending on the particular need of the print job on hand. When water-soluble dyes are used, traces of dyes between the chamber housing a unique combination of dyes is eliminated in part by the use of a hydrophobic coating which prohibits the attaching of the water-soluble dyes to the inner surface of the chamber itself, as well as the rinsing of the chamber itself with a series of rinses with a water-soluble rinsing agent, culminating at a built-in waste disposal system to manage and/or dispose of this flushed fluid. Note that oleophobic coatings can be used for non-polar solvents used with dyes such as disperse dyes.

In general, the present invention succeeds in conferring the following, and others not mentioned, benefits and objectives:

It is an object of the present invention to automate the 3D printing process.

It is an object of the present invention to print objects in three dimensions.

It is an object of the present invention to print objects in color.

It is an object of the present invention to create a 3D printing device that can be wheeled through a standard doorway.

It is an object of the present invention to lower the cost of printing 3D objects in color.

It is an object of the present invention to automate the process of turning a computer file into a real-world object.

DESCRIPTION OF THE PREFERRED EMBODIMENTS

Figure 1A:
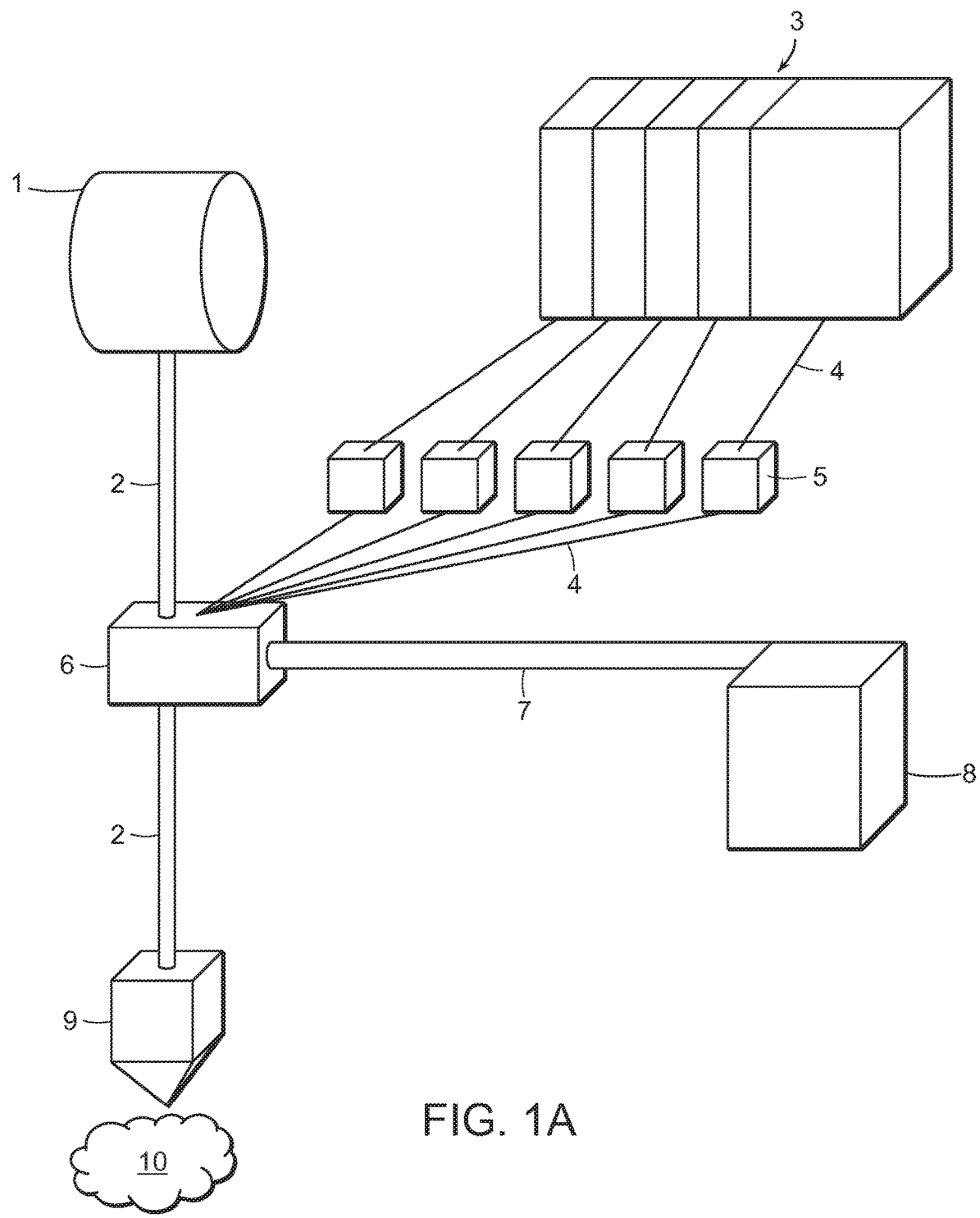
FIGS. 1A-1B show schematics of two embodiments of the device of the present invention.

The preferred embodiments of the present invention will now be described with reference to the drawings. Identical elements in the various figures are identified with the same reference numerals.

Reference will now be made in detail to each embodiment of the present invention. Such embodiments are provided by way of explanation of the present invention, which is not intended to be limited thereto. In fact, those of ordinary skill in the art may appreciate upon reading the present specification and viewing the present drawings that various modifications and variations can be made thereto.

Referring to FIG. 1A, an overview of the components of an embodiment of the device of the present invention is provided for. Here, the present invention comprises a material dispenser 1, a filament 2, a tank system having a plurality of subchambers 3, a first set of tubing 4, a plurality of pumps 5, a mixing chamber 6, a second set of tubing 7, a waste management system 8, and an print head 9 which has an extruder. A printed object 10 is generated when this embodiment of the device of the present invention performs an embodiment of the method of the present invention. Generally, this embodiment operates by colored filament exiting the mixing chamber traveling to the print head 9 and becoming part of the desired object that is being printed. The dispensing tank system, consists of a plurality of subchambers 3, each intended to house a different color of dye. In a preferred embodiment, dispensing tank system is comprised of five subchambers 3, one for cyan dye, one for magenta dye, one for yellow dye, one for black dye, and one for a solvent that is capable of solubilizing the dye. For example, should the dye used be a disperse dye, the solvent chamber would contain an organic solvent and should the dye be a water-soluble dye, the solvent chamber would contain water.

Note that by placing certain combinations of dyes in the plurality of subchambers 3, one is capable of creating composite colors in either the red-green-blue ("RGB") color chart, the pantone color matching system, or the cyan-magenta-yellow-key ("CMYK") color chart. Logically, the base colors used in those systems should be loaded into the plurality of subchambers 3.

In an alternative embodiment, the present invention has a plurality of chambers that are pre-filled with all of the desired colors. In this embodiment, it is preferable to have an additional solvent chamber, to allow for the end product to be of the desired color tint. Preferably, this chamber will be equipped with a separate heater. In yet another alternative embodiment, only a single subchamber exists and the desired dye is simply poured into this single subchamber. In a preferred embodiment, the subchambers of the present invention are equipped with drains at the bottom. This configuration has the benefit of allowing gravity to assist the disbursement of the dye from the subchamber. In one embodiment, a tank system is arranged where dye is sucked up-and-out like a vacuum hose dunked into a bucket of water, or a more purpose-built tank with a drain at the bottom similar to a bathtub or a shower with a drain centered at the lowest point. Comparing functionality these arrangements are identical if one uses peristaltic pumps, as these pumps do not require priming; that is, a measurable amount of back-pressure created by the fluid itself or some other force. In some embodiments, the present invention is equipped with a fluid-level sensor 12 (see FIG. 3A) which can either continuously monitor the level of the fluid, or can merely alert a user that a given threshold or thresholds have been reached. The subchambers 3 may have a screw top, a flap top, may be left without a top, or may employ some sort of other sealing device.

The first set of tubing 4 is preferably of a small diameter as it is used for transporting dye between tanks and mixing chamber, with pumps in between controlling flow. In various embodiments, this first set of tubing 4 will have a diameter ranging from 1 mm to 5 mm, depending on the needs of the user. The first set of tubing 4, when it terminates at the mixing chamber 6, are preferably adorned with nozzles to reduce dye droplet size entering the mixing chamber 6. In various embodiments the mixing chamber 6, one of the plurality of subchambers 3, or the first set of tubing 4 may contain one or more surfactants to reduce surface tension of the solvent, further reducing possible dye droplet diameter and therefore increasing potential color resolution. The plurality of pumps 5, are preferably peristaltic pumps. These pumps are preferable due to their accuracy in dispensing small amounts of fluid as well as preventing flow when pumps are not activated. In a preferred embodiment, there is a pump 5 for each of the subchambers 3 in the tank system. The dyes are dispensed from dispensing tank system, through the plurality of pumps 5 and the first tubing 4, into the mixing chamber 6 so that the dyes form a homogeneous colorant housed within the interior volume of the mixing chamber 6. The filament 2 then passes through the mixing chamber 6 to absorb color contained therein. The interior of the mixing chamber may possess a hydrophobic coating to prevent color contamination between different color prints. After the filament 2 is fully imbued with the color of the homogenous dye, it is transported to the print head 9 where the machine selectively disposes the colored thermoplastic material to create the print object 10. The second set of tubing 7 is used to remove any of the mixed dye that has not been used to color the filament 2.

Figure 1B:
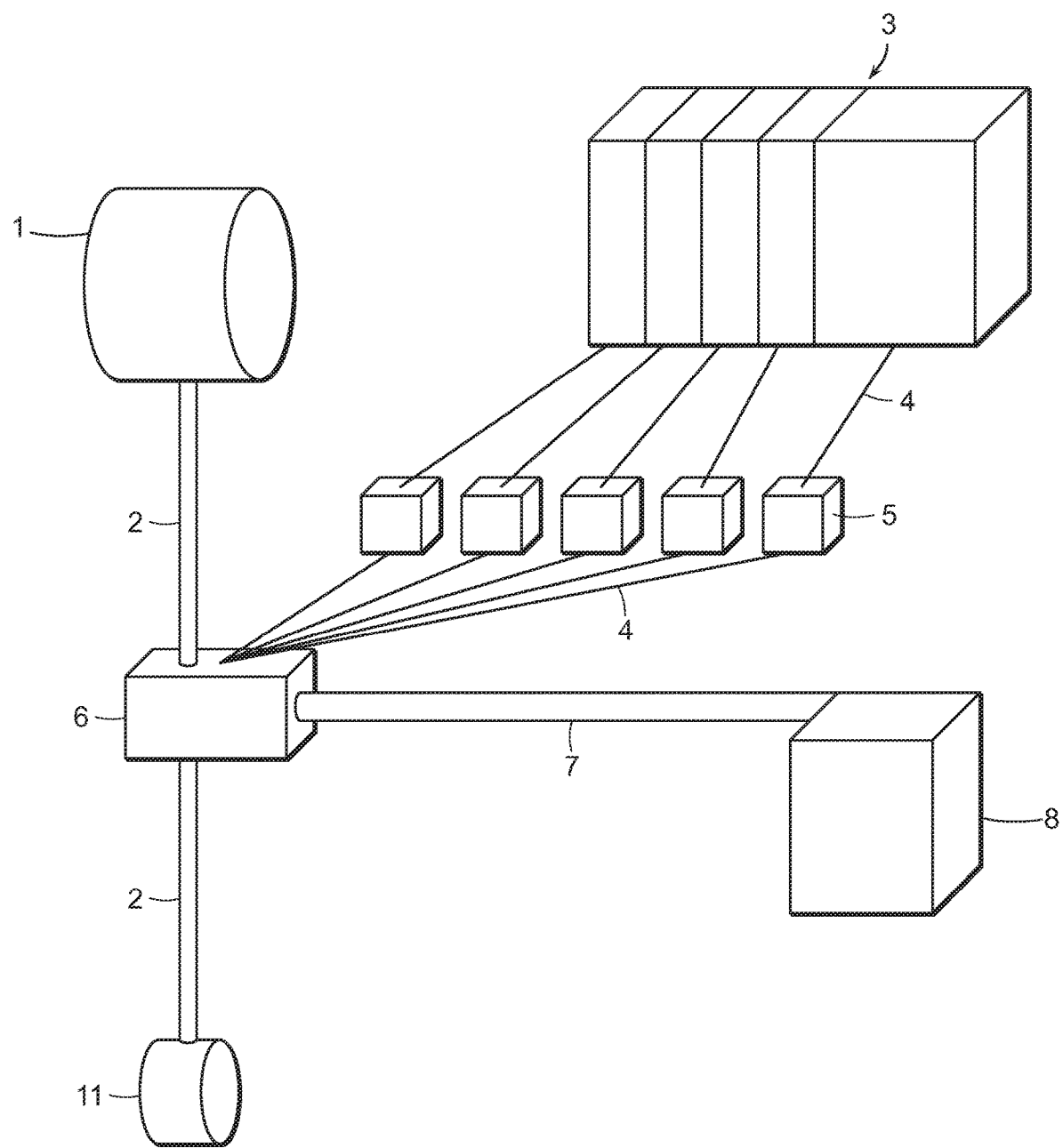

Referring to FIG. 1B, an overview of the components of an embodiment of the device of the present invention is provided for. Here, the present invention comprises the material dispenser 1, the filament 2, the tank system comprised of a plurality of subchambers 3, the first set of tubing 4, the plurality of pumps 5, the mixing chamber 6, the second set of tubing 7, the waste management system 8, the print head 9, and a spool winding mechanism 11. This particular embodiment can be used to create colored filament of any shade, on-demand, to be used in a 3D printer that is not capable of having this system built-in or is not within feasible proximity of this system's location. In a preferred embodiment, the material dispenser 1 is a spool of uncolored filament. In another embodiment, the material dispenser 1 is a pellet-to-filament extruder. In yet another embodiment, the present invention is equipped to work with any thermoplastic polymer in the manner described above. In another preferred embodiment, the filament 2 can be constructed out of polylactic acid ("PLA"), acrylonitrile butadiene styrene ("ABS"), nylon, polyvinyl alcohol ("PVA"), polyamide, high-density polyethylene ("HDPE"), polyethylene terephthalate ("PET"), either alone or in some combination. The second set of tubing 7 is preferably constructed with a large-diameter tube having a diameter of at least 1 centimeter, although these tubes can be as large as the mixing chamber itself to facilitate drainage from the mixing chamber 6. In a preferred embodiment, the waste management system 8 comprises a pipe that connects directly to an external drain. In another embodiment, the waste management system 8 has a collection vessel which the dye drains into. Preferably, this collection vessel will be monitored such that it will not overflow. More preferably, this collection vessel will be housed in the same housing as the 3D printer according to the present disclosure to create a discrete, portable unit. In yet another embodiment, the waste management system 8 employs evaporative techniques to remove the excess dye. These evaporative techniques may include, but should not be limited to heat application and the use of ultrasound. This figure also contains the spool-winding mechanism 11, which replaces the print head 9 shown in FIG. 1. Instead of selectively disposing the colored filament as the print head 9 does, the spool-winding mechanism 11 collects the colored filament so that it may be used with other extruders not containing the filament-coloring capabilities of the embodiments disclosed herein.

Regarding the ability of the 3D printer according to the present disclosure to completely color the filament 2, certain conditions must be met. These conditions depend on the type of material used to construct filament 2, as well as the type of dye used in the tank system having a plurality of subchambers 3. Specifically, if the filament 2 is constructed out of polyamide, the dye would have to be a disperse dye or an acid-based dye. Additionally, the polyamide filaments can be dyed with water-soluble dyes under heated conditions. If the filament 2 is construed out of acrylonitrile butadiene styrene or polylactic acid, it can be dyed with disperse dye under heated conditions. If the filament 2 is constructed out of polycarbonate, then an oil-based (solvent-based) dye should be used. Lastly, for polystyrene, a substantive dye may be used. It should be noted that while these combinations will result in a fully-colored filament, the exact conditions can vary based on the diameter of the filament, and the amount of heat present in the mixing chamber 6. For example, polylactic acid when treated with a volatile solvent such as alcohol will become dyed almost instantaneously, even at room temperature, however the possible combinations are too numerous to list here.

Figure 2:
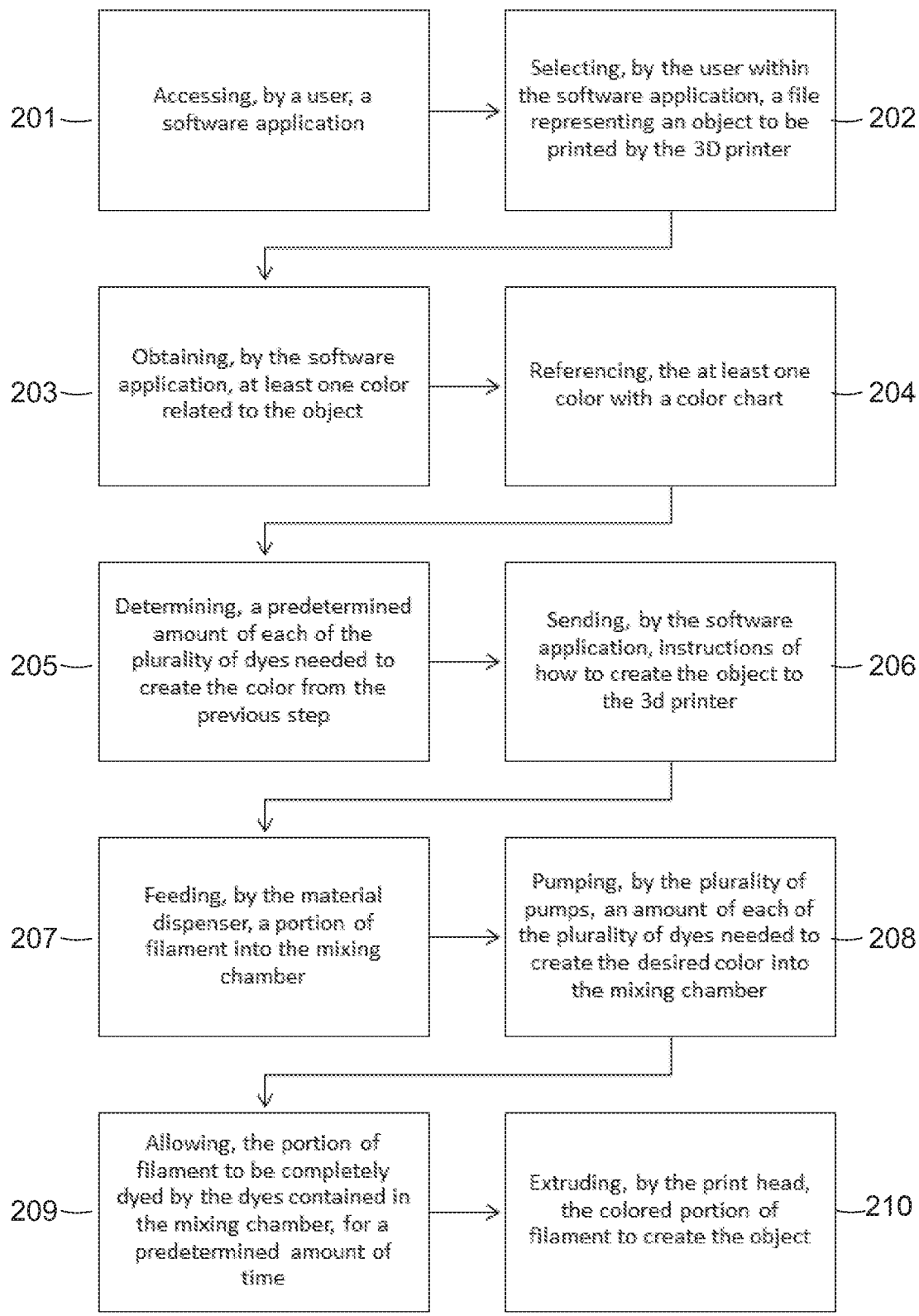
FIG. 2 shows a flow chart illustrating an embodiment of the method of the present invention.

Referring to FIG. 2, a flowchart illustrating an embodiment of the method of the present invention is provided. Here, the entire process begins with step 201, where a user accesses a digital interface. This interface can either be on a computer directly connected to the present invention, on the present invention itself, or can be a web interface running on a remote webserver, which is connected to the present invention via protocols such as Ethernet or Wi-Fi. The remote webserver embodiment has the additional benefit of allowing the user to print from any internet-connected device regardless of the user's proximity to the physical printer itself. From there, in step 202, the user selects a file or files that represent a 3D object(s) to be printed via a digital interface. The system then determines if the file is able to be processed by the system. This is done by comparing the file extension to a list or table of file extensions that the system can process. If the file type is not acceptable, the user is notified and has the opportunity to input the file in a different format that is acceptable by the system. Once a file is accepted, the method proceeds to step 203 where it is determined whether this file contains information relating to the unique color of the intended EAC object(s). If the file contains color information, then this information is parsed from the file and compared to a table of possible colors in step 204. If the color information extracted from the file does not match with a color the system is currently configured or capable of creating, then the user is notified and asked to approve of the closest-available color or manually select a color. Alternatively, if the nature of the file type selected does not contain information regarding the color of the intended EAC object(s), then, if the user desires, the user may, by use of said graphical user interface, select a color from a provided color palette. The desired color for the EAC object(s) is now known to the system. For each possible color the system is configured to create, the proportion of the dyes used along with an optional solvent, if needed, to color one unit of filament is known. While the volume of the mixture of dyes needed for the entire construction can be determined directly from the output of the slicing program, the combination of dyes needed to achieve a unique color will require the use of a reference table, unique to the liquid dyes used coupled with the devices and methods mentioned and described in this application, which is done in step 204. The file(s) representing the 3D object to be printed is directly sent to a slicing program, which converts the 3D file into machine code in which serves as the specific instructions for what each component of the 3D printer ought to do, from the beginning to the end of the print job. In step 205, the amount of each of the plurality of dyes needed to create the desired color is determined. This information is sent to the 3D printer in step 206 where a determination of the size of the portion of filament needed for the construction is determined, and crucially, it is at this point that the amount of liquid dye needed to achieve sufficient colorization for the quantity of filament to be used is determined. This portion of filament is then fed into the mixing chamber in step 207. The primary means of colorization of the EAC object is by use of liquid dyes which will be uniquely combined within a mixing chamber. In step 208, the plurality of pumps will pump an appropriate amount of each dye (and optionally a solvent) to provide the desired color within the mixing chamber. These dyes may be allowed to diffuse to form the desired color, of the dyes may be mechanically stirred. The filament will be allowed to traverse through the liquid dye in the mixing chamber while being submerged in step 209 before being extended to create the desired object in step 210. Once the filament is completely colored, it is extruded through the print head. If a second color is required to be in the filament, steps 208, 209, and 210 will be repeated until the object has been successfully completed. In a preferred embodiment, upon exiting the mixing chamber the filaments will be dried while traversing a series of forced air fans before entering the printhead. This is achieved by use of a mixing chamber and tank system comprising a series of liquid dye holding chambers.

Figure 3A:
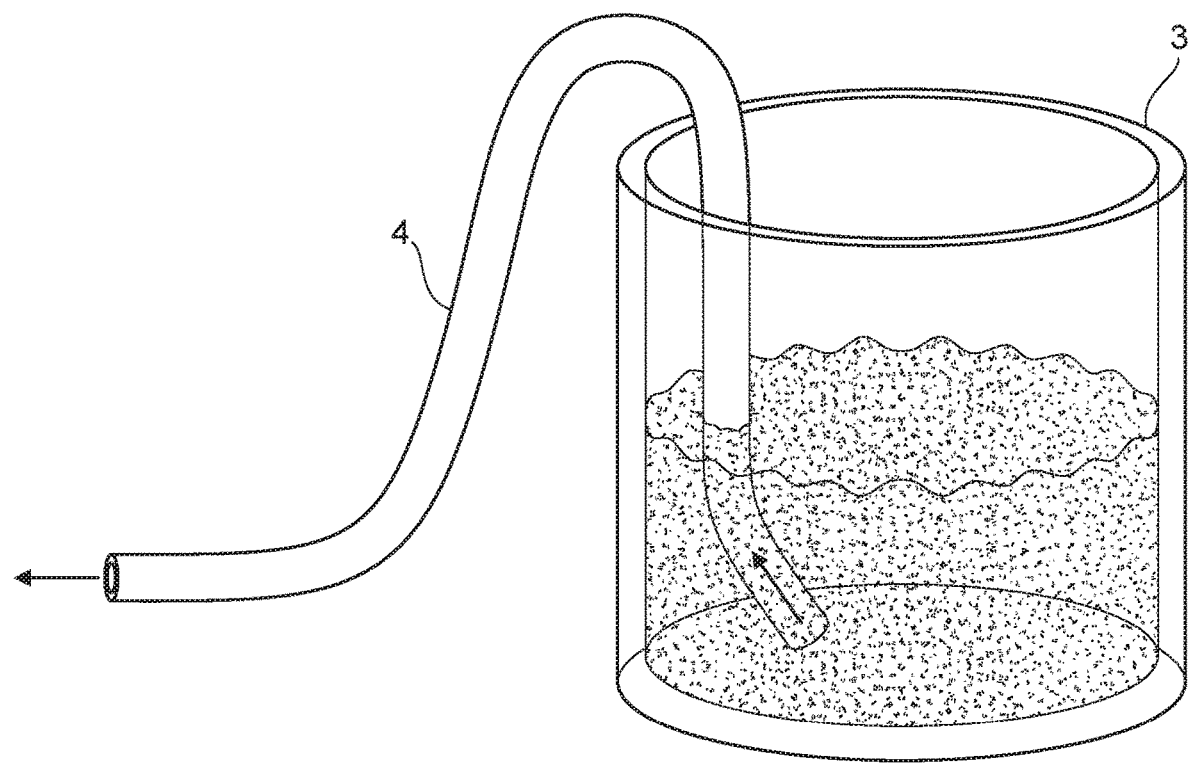
FIGS. 3A-3N show various embodiments of the dye tank of the present invention, including ways to extract, measure, and replace dye in said tank or in the waste management system.
Figure 3B:
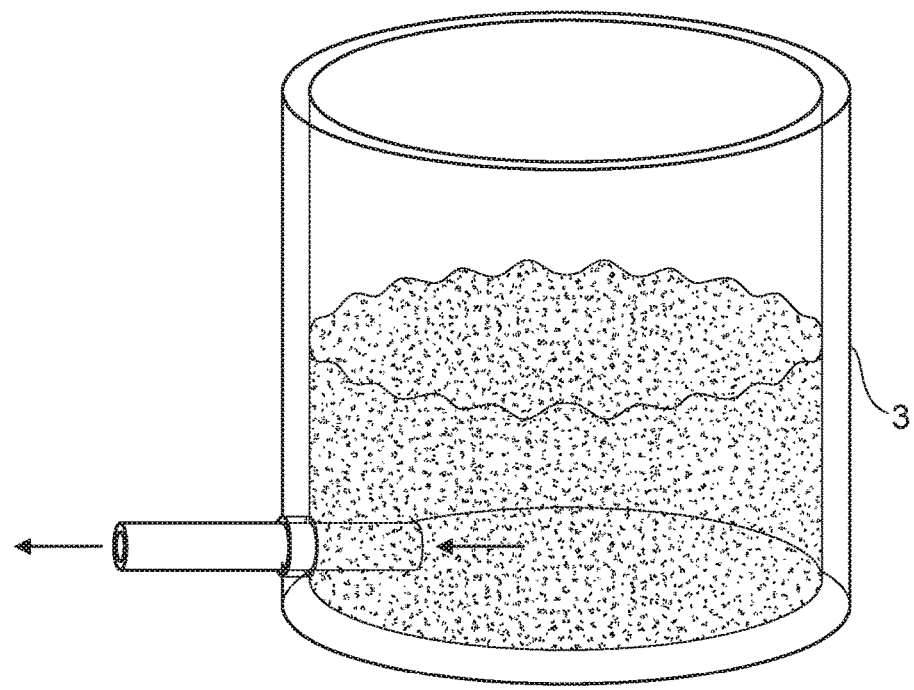
Figure 3C:
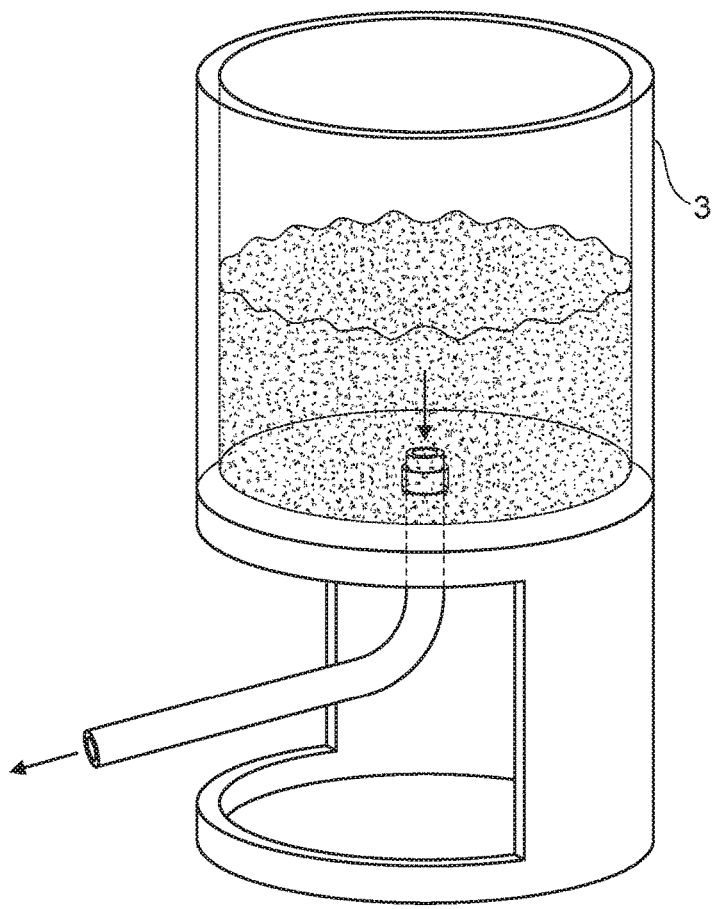

Referring to FIGS. 3A-3C, embodiments of one member of the tank system in its most basic configuration is shown. Here, this subchamber 3 is comprised of a sealed vessel, and a mechanism for drawing the liquid contents out of this vessel. Specifically, the configuration shown in FIG. 3A allows for the fluid to be taken up, through the tube 4, and subsequently out through an attached drainage mechanism. In FIG. 3B, the mechanism draws the liquid away from via the side of subchamber 3, and in FIG. 3C, a preferred embodiment of the mechanism is comprised of a bottom drain, using gravity to facilitate the removal of the liquid. The embodiment shown in FIG. 3C is beneficial because it provides for the subchamber 3 to be completely emptied without additional components and allows for less powerful (e.g. more efficient, smaller, quieter, cheaper) pumps 5 (See FIG. 1) to be used with the present invention. It should be noted that the sealed vessel can be of any shape that suits a user's preferences.

Figure 3D:
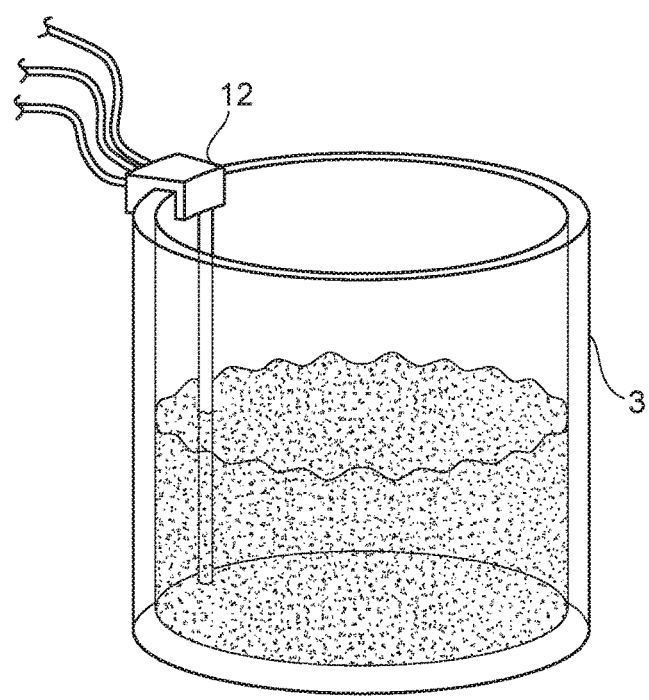
Figure 3E:
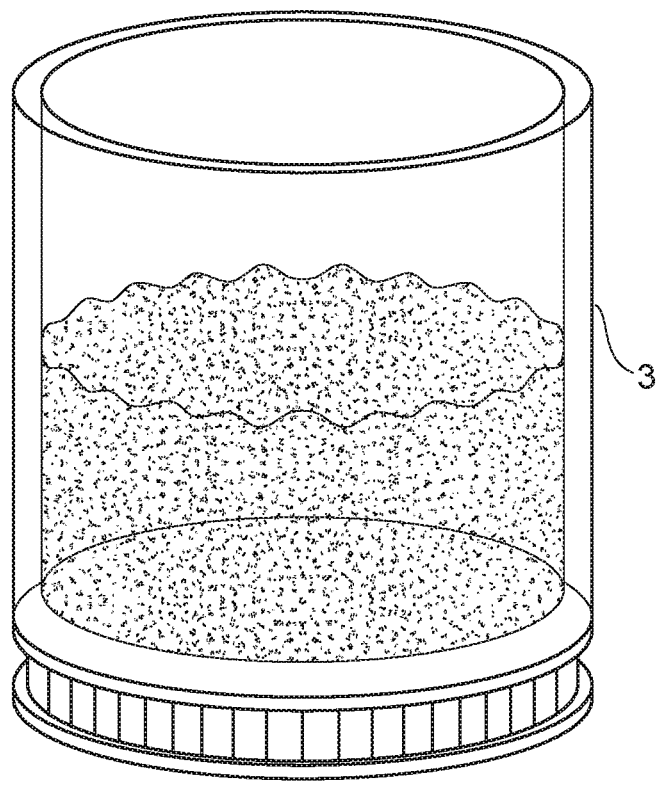
Figure 3F:
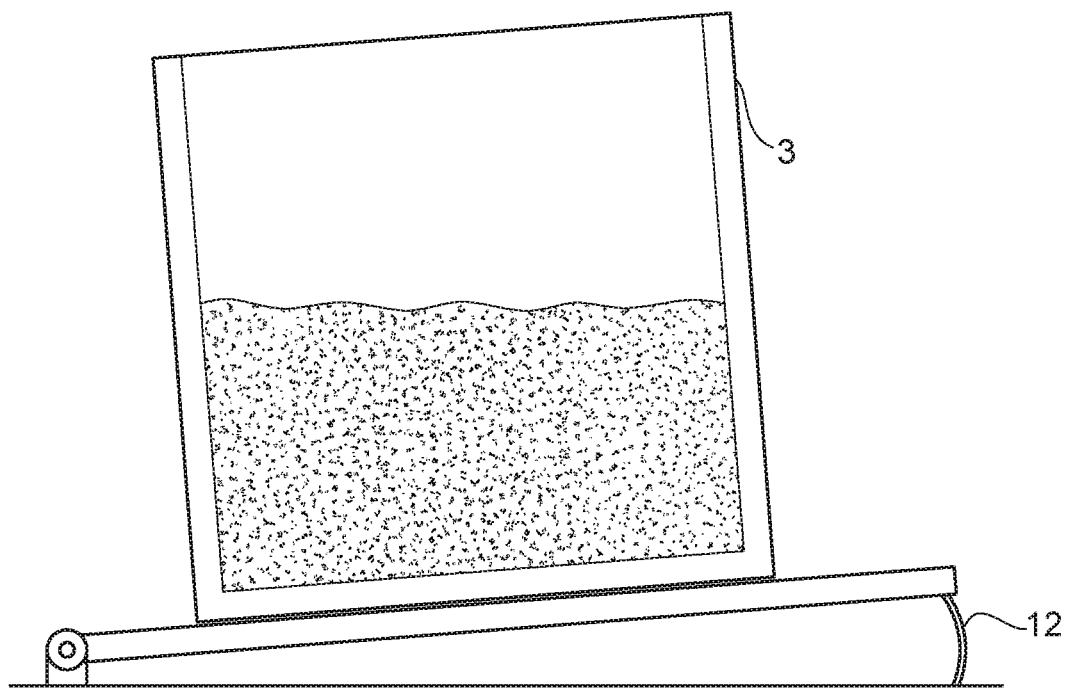

FIGS. 3D, 3E, and 3F show various mechanisms for measuring the amount of fluid in the subchambers 3. These mechanisms may also be employed for measuring stored waste dye, and for flushing residual fluid. It is important to determine the amount of fluid that is in a given subchamber 3, so that a user may determine there is enough of any given colored-dye (or solvent, when desired) to complete a print before the printing process has started. In contrast, when these mechanisms are employed in the waste removal system 8 (see FIG. 1), it is important to know that the collection vessel has sufficient capacity to store the waste dye before the printing process has started.

Figure 3G:
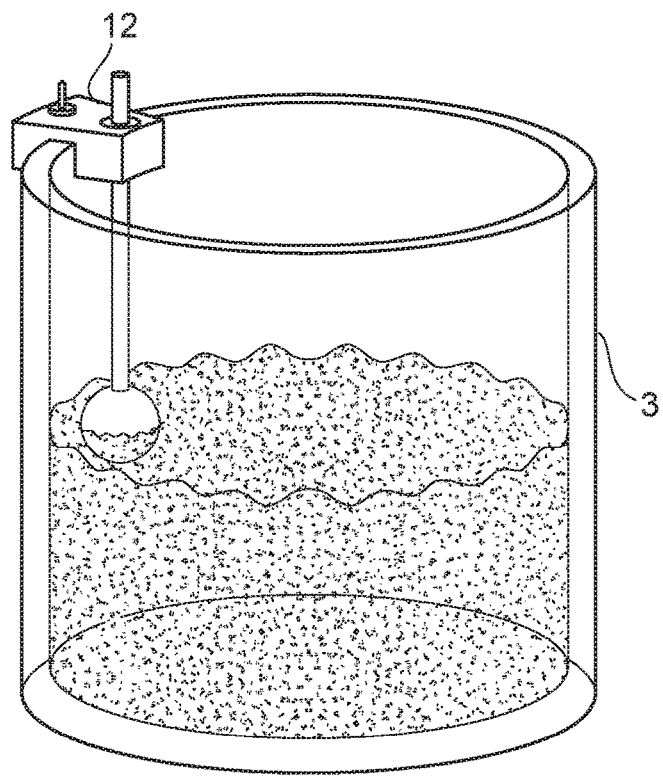
Figure 3H:
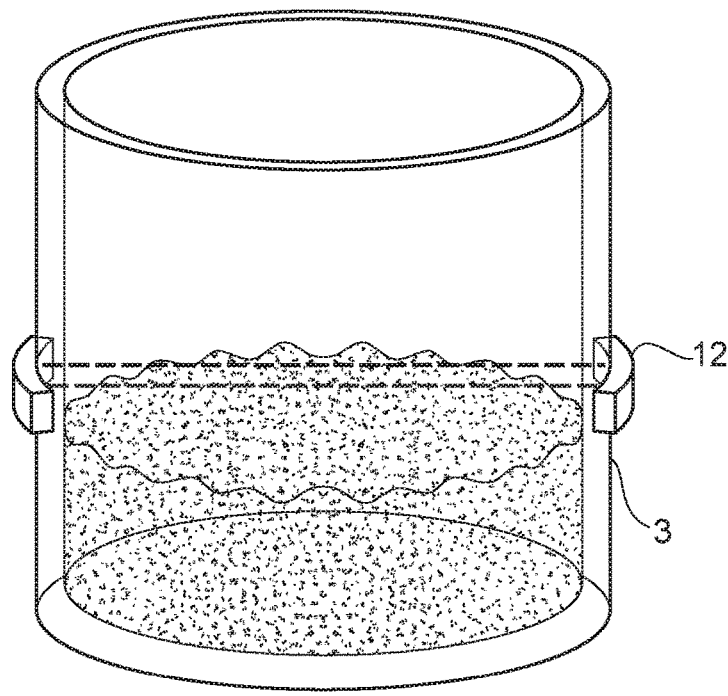

In FIG. 3D, the tank is equipped with an eTape liquid level sensor 12, that merely needs to be placed somewhat vertically in the subchamber 3 such that the change in voltage read across the sensor can yield the percentage full (or empty) of the tank. This configuration has the benefit of not containing moving parts, which are prone to breaking. Similar variable resistor electronic components may also be used in substitute of the commercially available eTape product. In FIG. 3E, the fullness of the tank is determined by measuring the weight of the subchamber 3. To achieve this result, the subchamber 3 is preferably located on a platform that is capable of moving in a vertical direction without tilting. The configuration shown in FIG. 3F operates by a sensor 12 being located at the arc of a hinged support for the subchamber 3. When the sensor 12 is variably bent due to variable weight of the subchamber 3 due to fullness or emptiness voltage read across the sensor can yield the percentage full (or empty) of the subchamber 3. FIG. 3G operates by using a buoyant sensor 12 that will rise and fall with the level of the dye in the subchamber 3. Below a certain fluid level, a circuit is triggered which results in a user being notified of the lack of liquid. There exist additional embodiments of the subchamber 3, whereby the subchamber 3 employs optical feedback sensor 12 to determine the amount of liquid in the subchamber 3. Similar to a tripwire, a light source on one end of the subchamber 3 would trigger a light receptor if the dye recedes below that line level. This embodiment requires that the subchamber 3 be partially or wholly translucent. FIG. 3H uses such an optical sensor arrangement to visually determine the level of dye in a given subchamber 3.

Figure 3I:
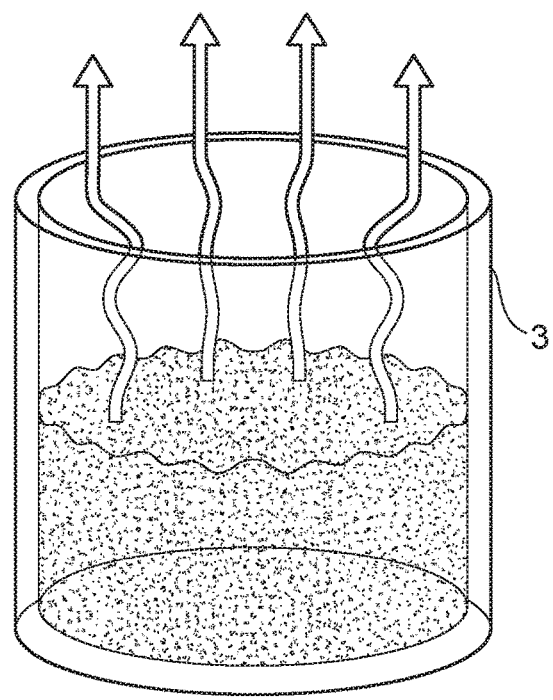
Figures 3J, 3K:
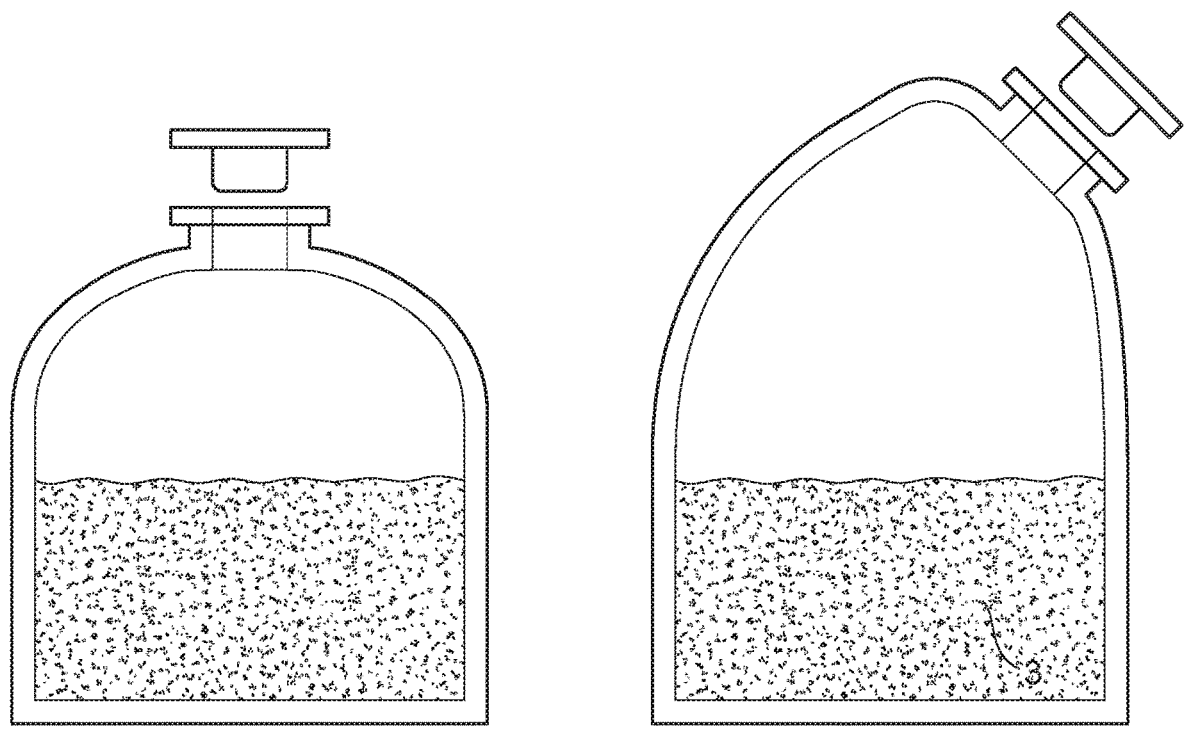
Figure 3L:
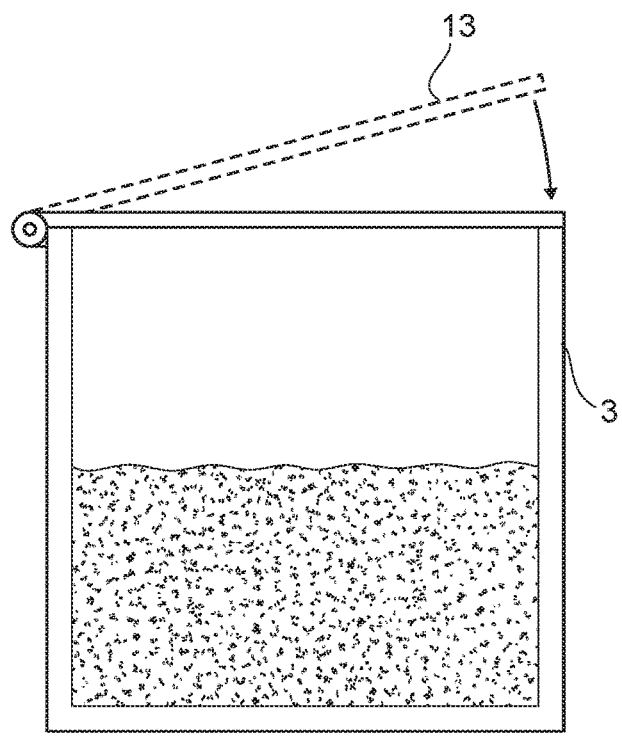
Figure 3M:
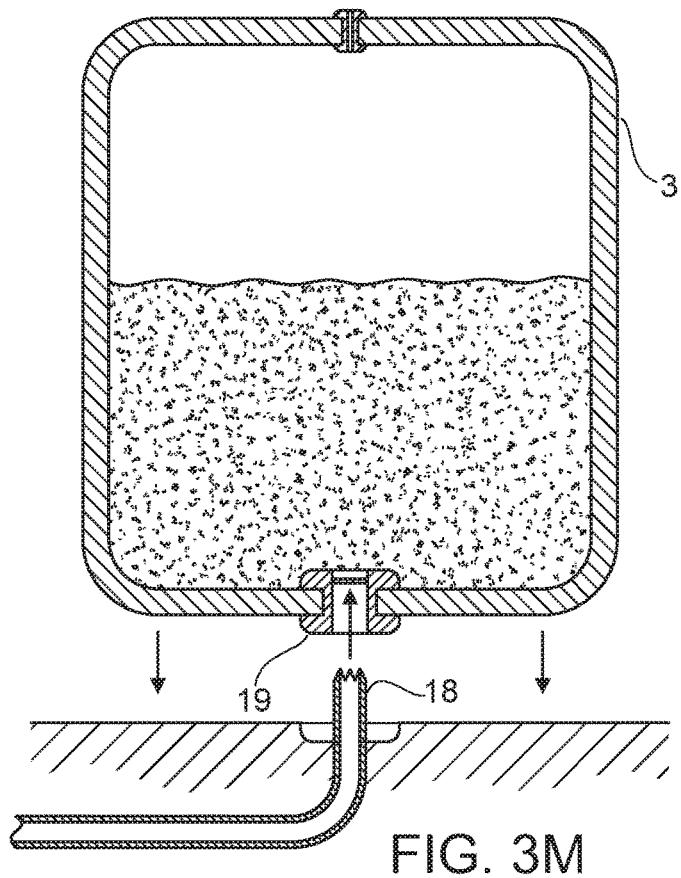
Figure 3N:
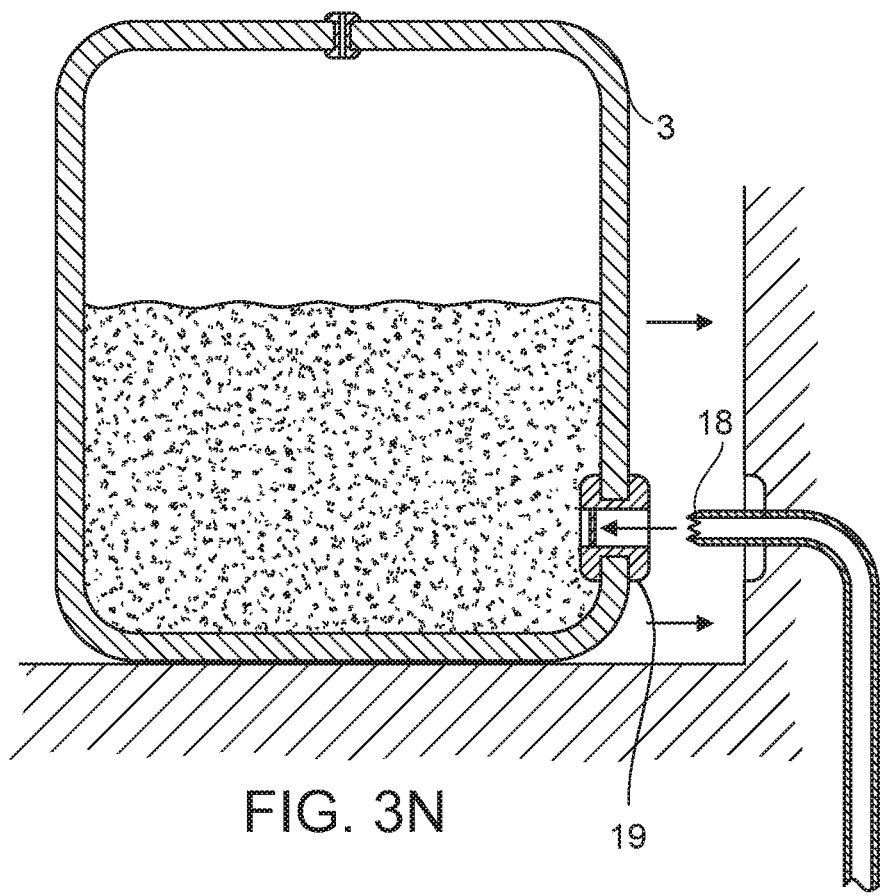

Referring to FIGS. 3I-3N show various configurations of the top portions of the subchamber 3 are provided. FIG. 3I shows a very simple configuration where the subchamber 3 comprises an open-air container, however this configuration is the most vulnerable to evaporation, contamination, or spillage. FIGS. 3J and 3K show subchambers 3 with a stopper plugging a fill port or a screw-on stopper/cap device the placement of which can either be completely vertical, or tilted for ease of pouring in dye media by the user. The configuration shown by FIG. 3L sports a flip-top lid 13. This configuration may have a "flap" lid. Preferably, this lid 13 will be a spring-loaded flap that the user would lift before pouring liquid into the subchamber 3. This provides for the additional benefit of limiting the risk of misplacing a cap and allows one to quickly top off the subchambers 3 using one hand to lift and another to pour. FIGS. 3M and 3N show configurations employing a disposable cartridge-based system. In these configurations, there will be a one-way air valve for internal pressure equalization and will require the fluid line-tank junction to be equipped with some sort of penetrating mechanism 18. Further, the cartridge itself will have an opening 19 sealed by some sort of penetrable membrane, such as foil, plastic, or some other equivalent membrane, which is ruptured when inserted into the tank system. Preferably, this opening is located at the bottom of the cartridge.

Figure 4A:
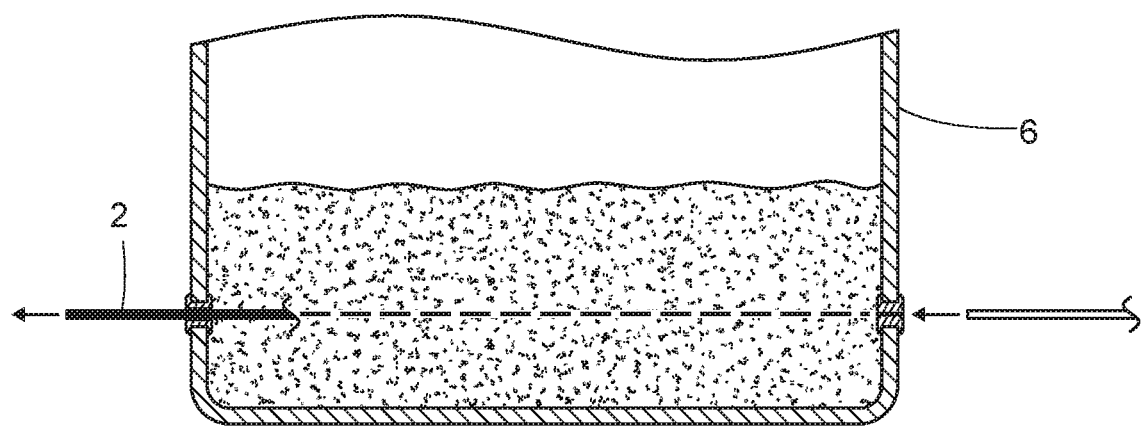
FIGS. 4A-4D show alternative embodiments of the dyeing chamber of the present invention.
Figure 4B:
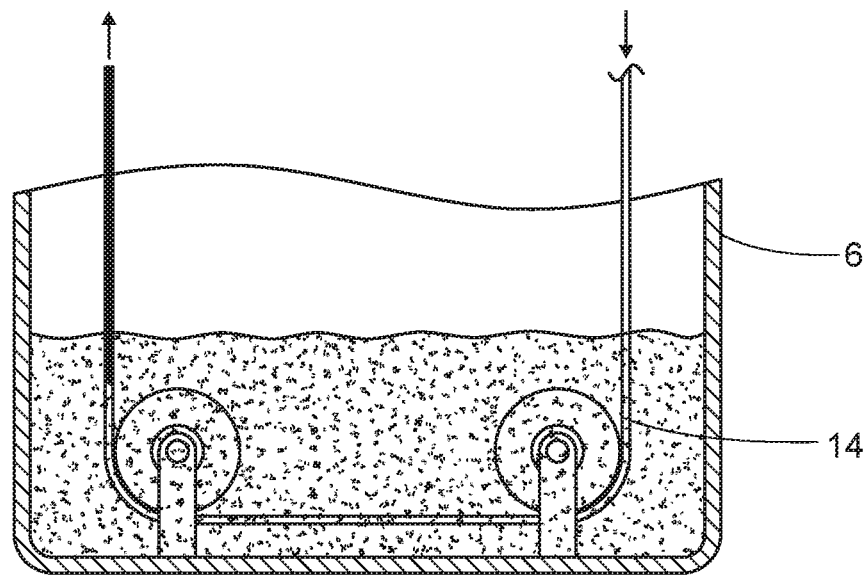
Figure 4C:
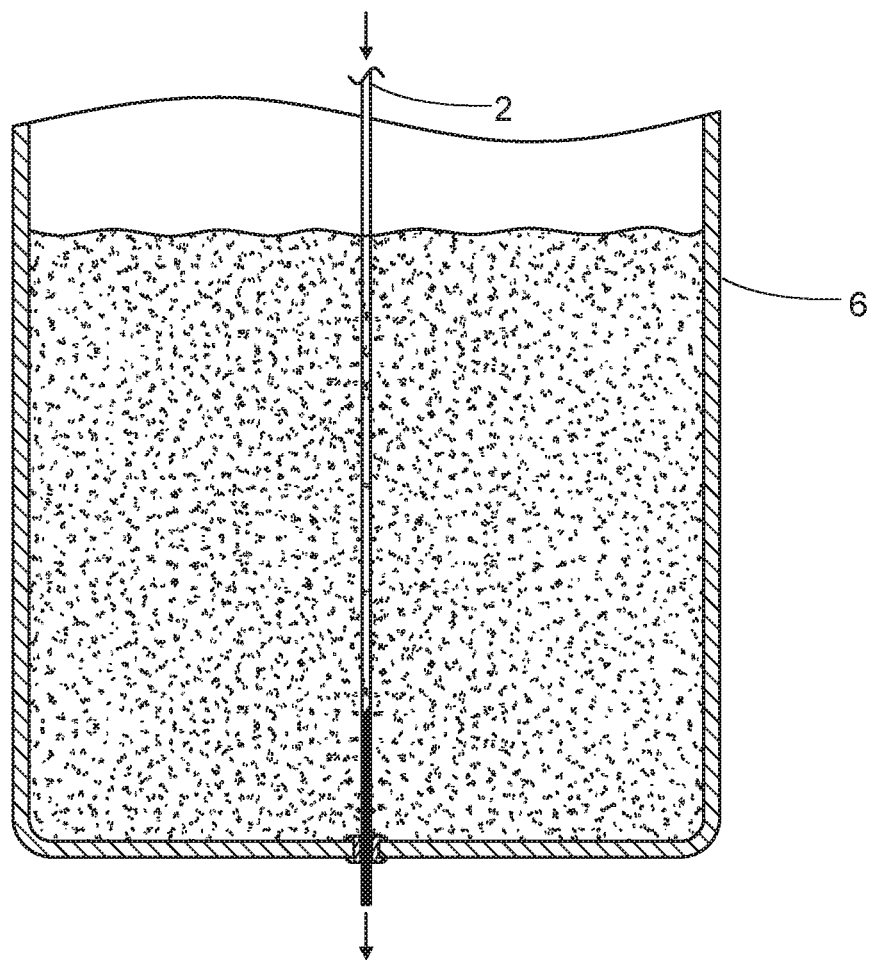

FIGS. 4A, 4B, and 4C illustrate an embodiment of the method of the present invention. Generally, the present invention operates by utilizing a liquid-impermeable vessel that allows the filament 2 to pass through it while simultaneously absorb a given amount of dye before exiting this vessel. For a filament 2 that needed to be colored with more than one color, embodiments exist where a plurality of subchambers 3 exist. Preferably, there will be one base dye per each of the plurality of subchambers 3.

Referring to FIG. 4A, an embodiment of the mixing chamber 6 is shown where the filament passes in and out of the chamber where the filament 2 enters the mixing chamber 6 from one side, and exits from a different side of the chamber 6. This configuration necessitates a type of "gland," which allows the filament 2 to freely or substantially freely pass through the gland, while simultaneously providing an adequate seal that prevents the dye from seeping out of the chamber 6. In some embodiments, this gland is a modified rubber stopper.

Figure 4D:
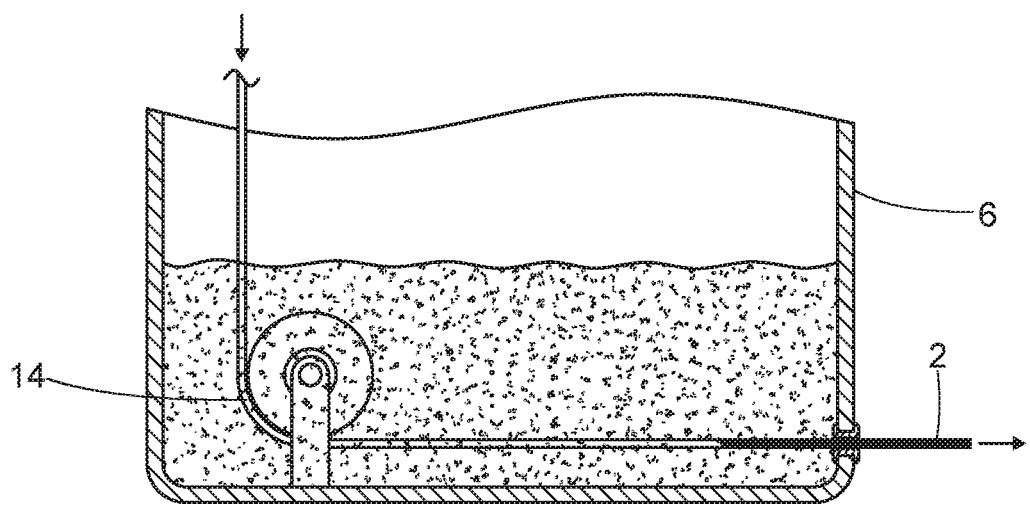

An alternative embodiment of the dye chamber is shown in FIG. 4B. Here, the filament 2 (See FIG. 4A) enters the chamber 6 above the dye line, and subsequently pivots to run along a side of the chamber 6, using a pulley-like device 14 to pass through the dye, and then exiting at a point above the dye line. A benefit of this system is that it is significantly more durable than the embodiment shown in FIG. 4A, and also alleviates any risk of spillage. Yet another alternative embodiment is shown by FIG. 4C. This embodiment is very similar to the embodiment shown by FIG. 4A, but the filament 2 passes vertically through the chamber 6 here. This is a highly-efficient version of the mixing chamber 6, as it is possible to have the filament 2 pass through the dye for a longer period of time per square footage used by this component within the device as a whole, however, by having the gland at the bottom of the chamber, potential leaking issues can become exacerbated. FIG. 4D shows yet another embodiment employing similar methodology.

FIGS. 5A-5D show various embodiments of the waste outlet 15 of the mixing chamber 6 of the present invention. It should be noted that in order to operate optimally, the waste outlet 15 must be at the lowest point in the chamber.

Figure 5A:
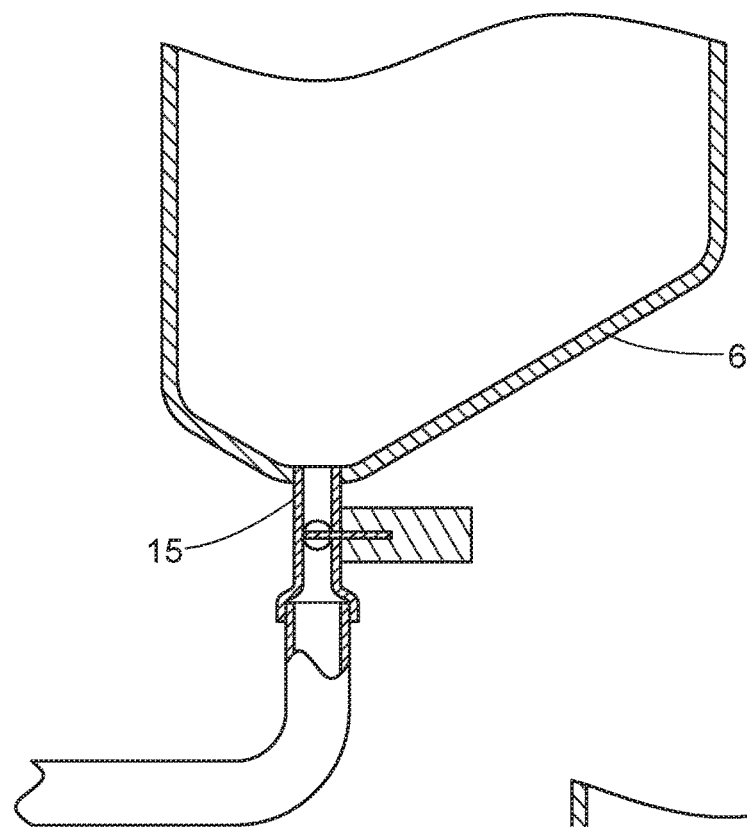
FIGS. 5A-5D show various embodiments of the waste outlet of the dyeing chamber of the present invention.

Referring to FIG. 5A, one embodiment of the waste outlet 15 of the present invention is shown. Here, after the print process has been completed, the waste outlet 15 is opened and gravity pulls down the fluid. Preferably, this valve will be actuated electronically. At this point, an appropriate solvent will be used to flush the mixing chamber 6. Further, the diameter of the waste outlet 15 must be sufficiently large so that any surface tension that results lacks sufficient force to prevent the complete drainage of the mixing chamber 6. Preferably, this valve is a solenoid valve, but other embodiments exist where a variety of electronically-actuated valves are employed.

Figure 5B:
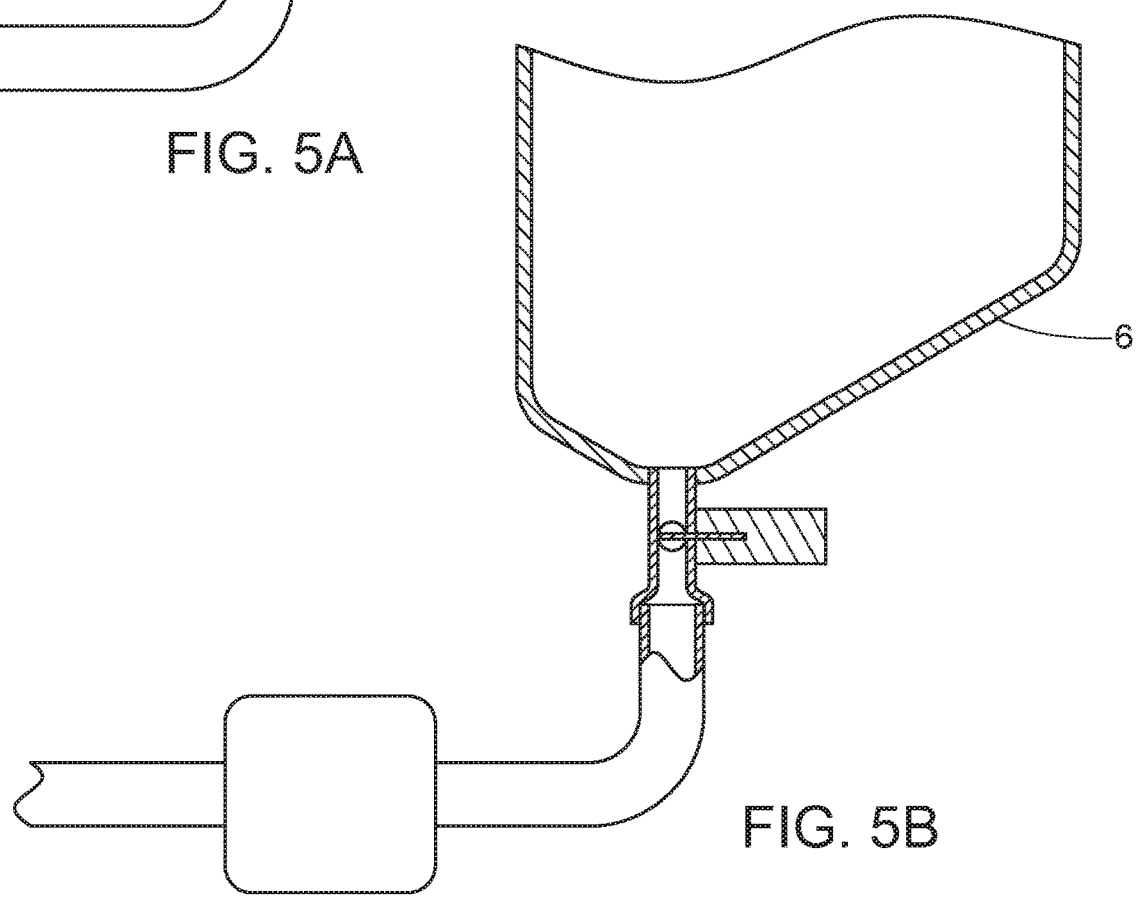
Figure 5C:
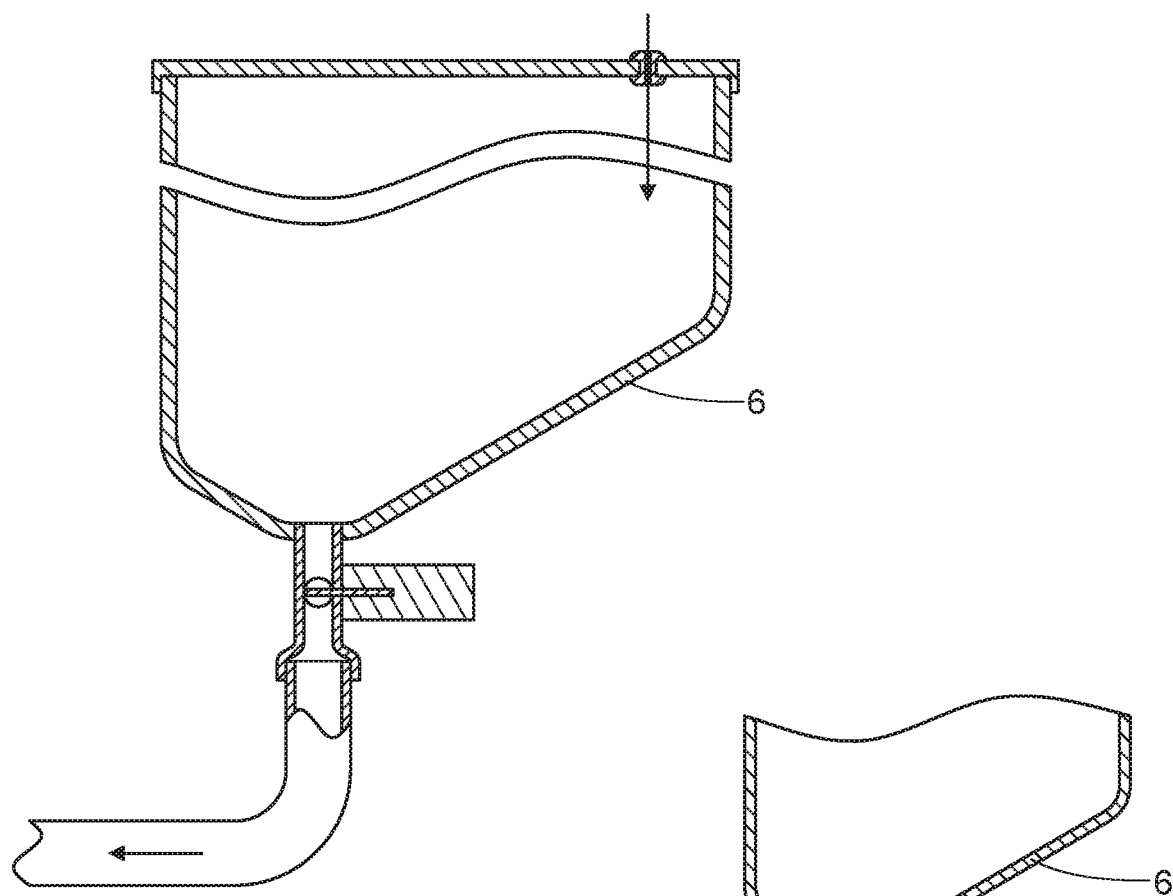
Figure 5D:
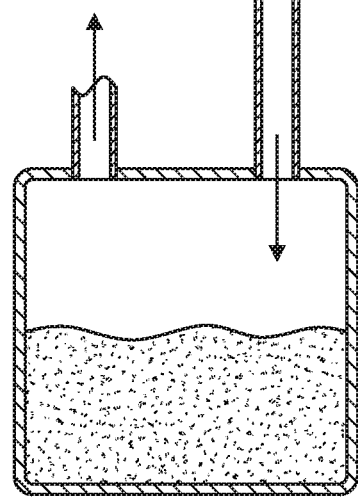

In FIG. 5B a pump-assisted drainage setup is shown. Depending on the needs of the user, this pump may be either peristaltic or impeller-based. This configuration has the additional benefit of allowing the mixing chamber 6 to be drained more quickly than a configuration that merely employs gravity. Yet another embodiment is shown in FIG. 5C. There, instead of fluid being pulled from the bottom of the chamber 6 via gravity, this fluid is pushed to the bottom via air pressure exerted from the top of the chamber 6. This embodiment requires that the mixing chamber 6 is configured to withstand a positive pressure contained in the interior volume for an extended period of time. In a preferred embodiment, the seals around where the filament input, filament output, and the filament enters the mixing chamber 6 are reinforced to prevent leakage. This positive pressure can aid with the absorption of the dye within the filament 2 (See FIG. 1). In addition to aiding with the absorption of the dye, the positive pressure can be used to aid in expelling dye from the mixing chamber 6 after the printer has finished constructing the object 10 (See FIG. 1). An additional embodiment is shown by FIG. 5D. This embodiment is an alternative air-based approach to drainage of the chamber 6. That is, in lieu of an impeller or peristaltic pump actively aiding in draining the chamber 6, as described above, here a siphon-style drainage mechanism making use of a vacuum pump is leveraged.

Figure 6A:
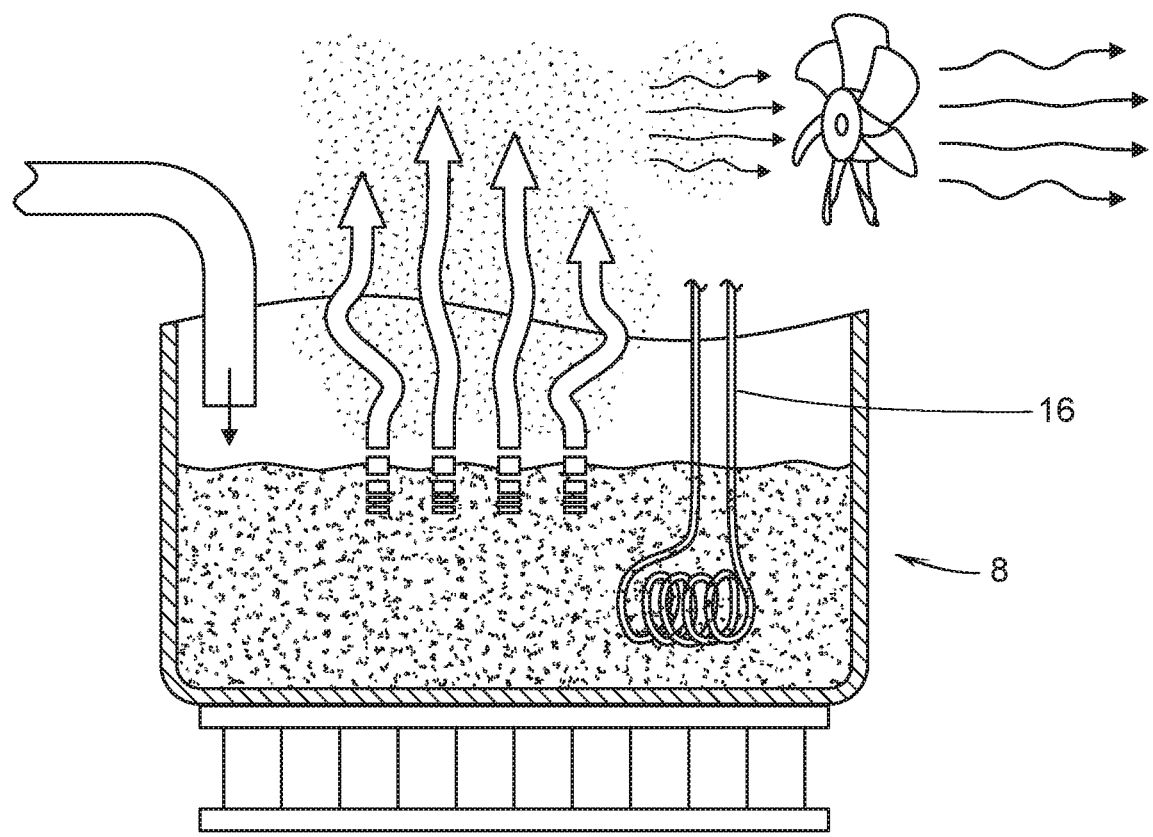
FIGS. 6A-6B show various embodiments of waste management system of the device of the present invention.
Figure 6B:
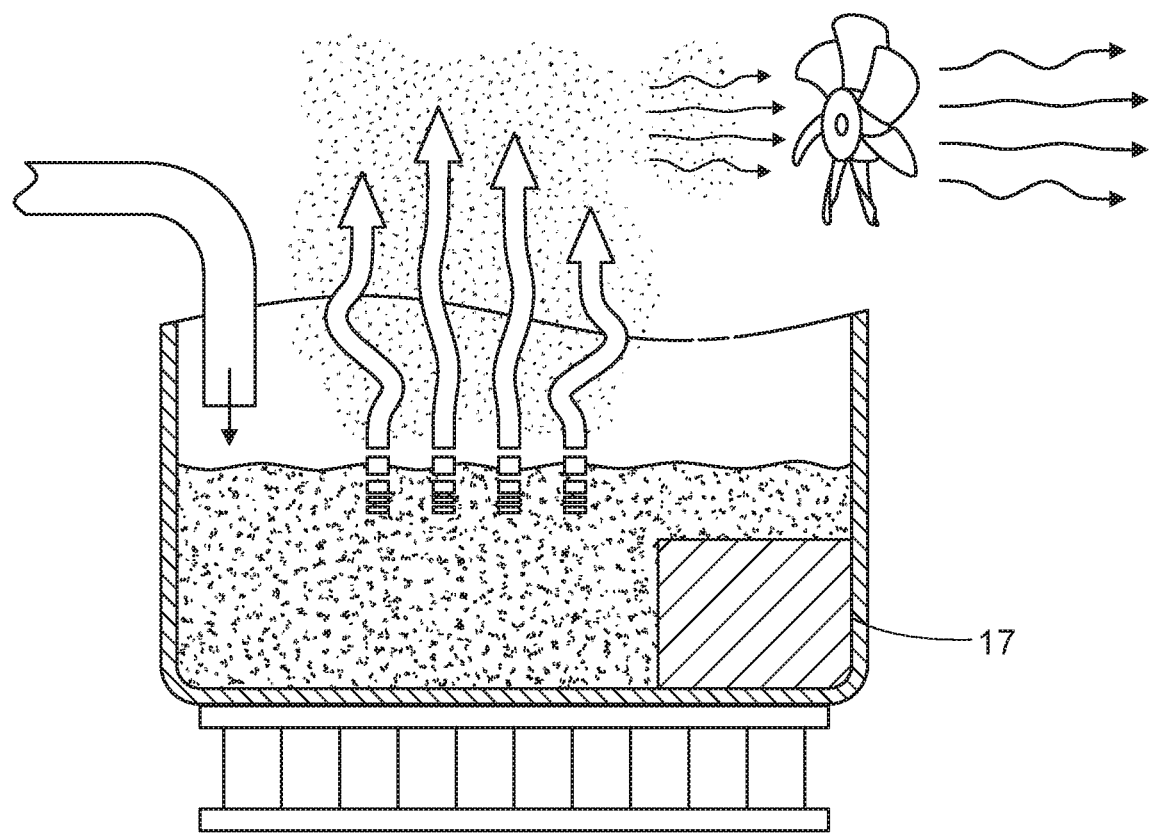

FIGS. 6A and 6B illustrate two additional methods of disposing waste dye from the dyeing chamber 6 contemplated by the present disclosure. In these embodiments, the dye disposed therein can either be stored until the mixing chamber 6 needs to be emptied, until the mixing chamber 6 is replaced by the end-user, or until the contents of the container need to be disposed of by the system.

In FIG. 6A, the present invention operates by evaporating dye collected in the waste disposal system 8 by raising the temperature of the waste via a heating element 16. The heating element 16 boils off the fluid into the surrounding environment, and no chamber needs to be emptied or replaced by the end-user. Preferably, the waste tank is equipped with a liquid-level sensor such that the heating element is only activated when needed. This functionality allows for greater safety, energy efficiency, and less frequent moisture dispensing to the surrounding environment. The embodiment shown in FIG. 6B utilizes an ultrasonic transducer 17, providing increased fire safety of the printer and aids in in preventing steam burns should a user place their hand next to the exhaust port of the present invention.

In another preferred embodiment, the present invention provides for a smaller printhead, or for some sort of watercooled, ultralight, dual-extrusion print head. In yet another preferred embodiment, the present invention has a chassis constructed out of metal. This provides the additional benefit of using the chassis itself as a heatsink to disperse any heat generated by the printer, reducing the fan noise typical of 3D-printing technology. Alternatively, if a radiator of sufficient size is used, the heat generated by the operation of the present invention will radiate out to the environment such that no fan is required at all.

In a preferred embodiment, the build platform of the present invention is encased. This encasement will preferably consist of an insulating material, even more preferably be constructed with integrated heat elements. This ability will reduce the warping of 3D printed objects known in the art. In one embodiment, the heat from the machine is parsed into this encasement chamber such that an efficient, controlled heating system is incorporated into the present invention.

While the present invention is capable of operating with a number of plastics/dye combinations, one particularly suitable dye is produced by The Rit Studio, owned by Phoenix Brands, LLC. These dyes combine easily to create any RGB, CMYK, or PMS color, depending on which base dyes are used.

In a preferred embodiment, a given mixing chamber is as small as 10 mL, but can be as large as 1 L, depending on what is being printed by the present invention, and the level of portability archived by a given embodiment.

Although this invention has been described with a certain degree of particularity, it is to be understood that the present disclosure has been made only by way of illustration and that numerous changes in the details of construction and arrangement of parts may be resorted to without departing from the spirit and the scope of the invention.

What is claimed is:

1. A method of constructing objects out of a completely colored filament, by an extrusion-based 3D printer having a tank system having a plurality of puncture mechanisms, a plurality of dyes, a corresponding number of subchambers and a corresponding number of pumps, each pump being in fluid communication with one subchamber, wherein each subchamber has an interior chamber equipped with a single opening and at least partially filled with one of the plurality of dyes, the single opening being sealed by a penetrable membrane, a mixing chamber having an interior volume, a filament input, a filament output, and a waste outlet, wherein the mixing chamber is in fluid communication with the plurality of pumps, wherein the plurality of pumps are configured to independently pump fluid from the corresponding subchamber, a material dispenser configured to dispense uncolored filament to the filament input, a waste management system in fluid communication with the waste outlet, a print head having an extruder configured to receive completely colored filament through the filament output, the method comprising the steps of:
    (a) accessing, by a user, a software application;
    (b) selecting, by the user within the software application, a file representing an object to be printed by the 3D printer;
    (c) obtaining, by the software application, at least one color related to the object;
    (d) referencing the at least one color with a color chart;
    (e) determining a predetermined amount of each of the plurality of dyes needed to create the color from the previous step;
    (f) sending, by the software application, instructions of how to create the object to the 3d printer;
    (g) feeding, by the material dispenser, a portion of uncolored filament into the mixing chamber;
    (h) pumping, by the plurality of pumps, an amount of each of the plurality of dyes needed to create the desired color into the mixing chamber;
    (i) allowing the portion of uncolored filament to be completely dyed by the dyes contained in the mixing chamber, for a predetermined amount of time;
    (j) extruding, by the print head, the completely colored portion of filament to create the object; and
    (k) repeating steps h-j until the object is completed.

2. The method of claim 1, further comprising the step of draining, the dye in the mixing chamber to the waste management system.

3. The method of claim 1, further comprising the step of heating the mixing chamber prior to the step of allowing the amount of uncolored filament to be completely dyed by the dyes contained in the mixing chamber, for a predetermined amount of time.

4. The method of claim 1, wherein each of the subchambers, when empty, are replaced with a pre-filled subchamber containing an additional dye equivalent to the dye contained in the empty subchamber.

5. An extrusion-based 3D printer, for constructing objects out of a completely colored filament, the extrusion-based 3D printer comprising:
    a tank system having a plurality of puncture mechanisms, a corresponding number of subchambers and a corresponding number of pumps, each pump being in fluid communication with one subchamber,
        wherein each subchamber has an interior chamber equipped with a single opening, the opening being sealed by a penetrable membrane,
        wherein one of the subchambers is filled with a solvent;
    a mixing chamber having an interior volume, a filament input, a filament output, and a waste outlet,
        wherein the mixing chamber is in fluid communication with the plurality of pumps,
        wherein the plurality of pumps are configured to independently pump fluid from the corresponding subchamber;
    a material dispenser configured to dispense uncolored filament to the filament input;
    a waste management system in fluid communication with the waste outlet; and
    a print head having an extruder configured to receive the completely colored filament through the filament output and to dispense the completely colored filament.

6. The extrusion-based 3D printer of claim 5, wherein the plurality of subchambers are disposable.

7. The extrusion-based 3D printer of claim 5, wherein the plurality of subchambers are refillable.

8. The extrusion-based 3D printer of claim 7, wherein at least one of the subchambers contains a dye within the interior chamber.

9. The extrusion-based 3D printer of claim 8, wherein each dye corresponds to one color in a color chart.

10. The extrusion-based 3D printer of claim 9, wherein the color chart is a pantone color chart.

11. The extrusion-based 3D printer of claim 9, further comprising an impeller pump fluidly connected to the mixing chamber,
    wherein the impeller pump is capable of pressurizing the interior volume.

12. The extrusion-based 3D printer of claim 9, wherein each dye is a disperse dye.

13. The extrusion-based 3D printer of claim 12, wherein the uncolored filament is constructed out of a material selected from the group consisting of: polyamide, acrylonitrile butadiene styrene, polylactic acid, and polycarbonate.

14. The extrusion-based 3D printer of claim 13, the mixing chamber further comprising a heating element capable of heating the mixing chamber.

15. The extrusion-based 3D printer of claim 9, wherein the solvent is capable of solubilizing each corresponding dye.

16. The extrusion-based 3D printer of claim 15, wherein the solvent is water, and each dye is a water-soluble dye.

17. The extrusion-based 3D printer of claim 16, wherein the uncolored filament is constructed out of a material selected from the group consisting of: polyamide and polystyrene.

18. The extrusion-based 3D printer of claim 15, the waste management system comprising a drain in fluid connection with a collection vessel.

19. The extrusion-based 3D printer of claim 18, the waste management system further comprising at least one ultrasonic generator located within the collection vessel.

* * * * *